(12) United States Patent
Shankar et al.

(10) Patent No.: US 9,219,928 B2
(45) Date of Patent: Dec. 22, 2015

(54) METHODS AND APPARATUS TO CHARACTERIZE HOUSEHOLDS WITH MEDIA METER DATA

(71) Applicant: The Nielsen Company (US), LLC, Schaumburg, IL (US)

(72) Inventors: Balachander Shankar, Tampa, FL (US); Molly Poppie, Arlington Heights, IL (US); David J Kurzynski, South Elgin, IL (US); Jarrett Garcia, Elgin, IL (US); Lukasz Chmura, Chicago, IL (US); Huaxin You, Princeton Junction, NJ (US); Peter Doe, Ridgewood, NJ (US); Christine Bourquin, Wheeling, IL (US); Timothy Dolson, Palm Harbor, FL (US); Jone Mary Burr, Palm Harbor, FL (US); Samantha M. Mowrer, Chicago, IL (US); Anthony Venetucci, Hampshire, IL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 14/313,414

(22) Filed: Jun. 24, 2014

(65) Prior Publication Data

US 2014/0380349 A1   Dec. 25, 2014

Related U.S. Application Data

(60) Provisional application No. 61/839,344, filed on Jun. 25, 2013, provisional application No. 61/844,301, filed on Jul. 9, 2013, provisional application No. 61/986,409, filed on Apr. 30, 2014, provisional application No. 62/007,535, filed on Jun. 4, 2014.

(51) Int. Cl.
*H04H 60/32* (2008.01)
*H04N 21/233* (2011.01)
(Continued)

(52) U.S. Cl.
CPC ......... *H04N 21/233* (2013.01); *G06Q 30/0204* (2013.01); *H04H 60/66* (2013.01);
(Continued)

(58) Field of Classification Search
USPC ........................................................ 725/9–21
See application file for complete search history.

(56) References Cited

U.S. PATENT DOCUMENTS 3,056,135 A   9/1962   Currey et al.
4,107,734 A   8/1978   Percy et al.
(Continued)

FOREIGN PATENT DOCUMENTS

GB   2260246   4/1993
GB   2292506   2/1996
(Continued)

OTHER PUBLICATIONS

Norris, "American Technology Corporation—Retailer Ads—AM & FM Sounds," May 4, 2004, retrieved from <http://www.woodynorris.com>, retrieved on Sep. 29, 2004 (3 pages).
(Continued)

*Primary Examiner* — Yassin Alata
(74) *Attorney, Agent, or Firm* — Hanley, Flight & Zimmerman, LLC

(57) ABSTRACT

Methods, apparatus, systems and articles of manufacture are disclosed to characterize households with media meter data. An example method includes identifying, with a processor, a household minute credited to a station in a household by a first media meter (MM) device, the first MM device collecting only audio data, determining whether a panelist audience meter device is crediting the station at the same time in the household, when the panelist audience meter device is crediting the same station, associating the household minute with an ambient tuning status, identifying a first automatic gain control (AGC) value and a first code status of the household minute, calculating model coefficients based on the ambient tuning status, the first AGC value and the first code status, and calculating a probability of ambient tuning based on the model coefficients.

21 Claims, 23 Drawing Sheets

(51) Int. Cl.
*H04N 21/258* (2011.01)
*H04N 21/239* (2011.01)
*H04N 21/25* (2011.01)
*H04N 21/24* (2011.01)
*G06Q 30/02* (2012.01)
*H04N 21/442* (2011.01)
*H04N 21/658* (2011.01)
*H04H 60/66* (2008.01)
*H04H 60/45* (2008.01)

(52) U.S. Cl.
CPC ........ *H04N 21/239* (2013.01); *H04N 21/2407* (2013.01); *H04N 21/251* (2013.01); *H04N 21/252* (2013.01); *H04N 21/25883* (2013.01); *H04N 21/44204* (2013.01); *H04N 21/6582* (2013.01); *H04H 60/45* (2013.01)

(56) References Cited

U.S. PATENT DOCUMENTS

| | | |
|---|---|---|
| 4,382,291 A | 5/1983 | Nakauchi |
| 4,626,904 A | 12/1986 | Lurie |
| 4,644,509 A | 2/1987 | Kiewit et al. |
| 4,695,879 A | 9/1987 | Weinblatt |
| 4,718,106 A | 1/1988 | Weinblatt |
| 4,769,697 A | 9/1988 | Gilley et al. |
| 4,779,198 A | 10/1988 | Lurie |
| 4,930,011 A | 5/1990 | Kiewit |
| 4,955,000 A | 9/1990 | Nastrom |
| 4,972,471 A | 11/1990 | Gross et al. |
| 4,972,503 A | 11/1990 | Zurlinden |
| 4,990,892 A | 2/1991 | Guest et al. |
| 5,119,104 A | 6/1992 | Heller |
| 5,146,231 A | 9/1992 | Ghaem et al. |
| 5,226,090 A | 7/1993 | Kimura |
| 5,226,177 A | 7/1993 | Nickerson |
| 5,285,498 A | 2/1994 | Johnston |
| 5,382,970 A | 1/1995 | Kiefl |
| 5,387,993 A | 2/1995 | Heller et al. |
| 5,404,377 A | 4/1995 | Moses |
| 5,442,343 A | 8/1995 | Cato et al. |
| 5,457,807 A | 10/1995 | Weinblatt |
| 5,473,631 A | 12/1995 | Moses |
| 5,481,294 A | 1/1996 | Thomas et al. |
| 5,483,276 A | 1/1996 | Brooks et al. |
| 5,550,928 A | 8/1996 | Lu et al. |
| 5,574,962 A | 11/1996 | Fardeau et al. |
| 5,579,124 A | 11/1996 | Aijala et al. |
| 5,581,800 A | 12/1996 | Fardeau et al. |
| 5,629,739 A | 5/1997 | Dougherty |
| 5,630,203 A | 5/1997 | Weinblatt |
| 5,640,144 A | 6/1997 | Russo et al. |
| 5,646,675 A | 7/1997 | Copriviza et al. |
| 5,692,215 A | 11/1997 | Kutzik et al. |
| 5,774,876 A | 6/1998 | Wooley et al. |
| 5,787,334 A | 7/1998 | Fardeau et al. |
| 5,793,409 A | 8/1998 | Tetsumura |
| 5,812,930 A | 9/1998 | Zavrel |
| 5,815,114 A | 9/1998 | Speasl et al. |
| 5,872,588 A | 2/1999 | Aras et al. |
| 5,884,278 A | 3/1999 | Powell |
| 5,893,093 A | 4/1999 | Wills |
| 5,982,808 A | 11/1999 | Otto |
| 6,002,918 A | 12/1999 | Heiman et al. |
| 6,035,177 A | 3/2000 | Moses et al. |
| 6,091,956 A | 7/2000 | Hollenberg |
| 6,098,048 A | 8/2000 | Dashefsky et al. |
| 6,243,739 B1 | 6/2001 | Schwartz et al. |
| 6,252,522 B1 | 6/2001 | Hampton et al. |
| 6,359,557 B2 | 3/2002 | Bilder |
| 6,396,413 B2 | 5/2002 | Hines et al. |
| 6,424,264 B1 | 7/2002 | Giraldin et al. |
| 6,430,498 B1 | 8/2002 | Maruyama et al. |
| 6,433,689 B1 | 8/2002 | Hovind et al. |
| 6,467,089 B1 | 10/2002 | Aust et al. |
| 6,470,264 B2 | 10/2002 | Bide |
| 6,493,649 B1 | 12/2002 | Jones et al. |
| 6,497,658 B2 | 12/2002 | Roizen et al. |
| 6,563,423 B2 | 5/2003 | Smith |
| 6,577,238 B1 | 6/2003 | Whitesmith et al. |
| 6,647,548 B1 | 11/2003 | Lu et al. |
| 6,654,800 B1 | 11/2003 | Rieger, III |
| 6,731,942 B1 | 5/2004 | Nageli |
| 6,748,317 B2 | 6/2004 | Maruyama et al. |
| 6,766,524 B1 | 7/2004 | Matheny et al. |
| 6,842,877 B2 | 1/2005 | Robarts et al. |
| 6,882,837 B2 | 4/2005 | Fernandez et al. |
| 6,888,457 B2 | 5/2005 | Wilkinson et al. |
| 6,898,434 B2 | 5/2005 | Pradhan et al. |
| 6,919,803 B2 | 7/2005 | Breed |
| 6,928,280 B1 | 8/2005 | Xanthos et al. |
| 6,934,508 B2 | 8/2005 | Ceresoli et al. |
| 6,940,403 B2 | 9/2005 | Kail, IV |
| 6,958,710 B2 | 10/2005 | Zhang et al. |
| 6,967,674 B1 | 11/2005 | Lausch |
| 6,970,131 B2 | 11/2005 | Percy et al. |
| 7,038,619 B2 | 5/2006 | Percy et al. |
| 7,046,162 B2 | 5/2006 | Dunstan |
| 7,076,441 B2 | 7/2006 | Hind et al. |
| 7,080,061 B2 | 7/2006 | Kabala |
| 7,099,676 B2 | 8/2006 | Law et al. |
| 7,126,454 B2 | 10/2006 | Bulmer |
| 7,148,803 B2 | 12/2006 | Bandy et al. |
| 7,155,159 B1 | 12/2006 | Weinblatt et al. |
| 7,171,331 B2 | 1/2007 | Vock et al. |
| 7,222,071 B2 | 5/2007 | Neuhauser et al. |
| 7,295,108 B2 | 11/2007 | Corrado et al. |
| 7,460,827 B2 | 12/2008 | Schuster et al. |
| 7,463,143 B2 | 12/2008 | Forr et al. |
| 7,471,987 B2 | 12/2008 | Crystal et al. |
| 7,483,975 B2 | 1/2009 | Kolessar et al. |
| 7,739,705 B2 | 6/2010 | Lee et al. |
| 7,882,514 B2 * | 2/2011 | Nielsen et al. .................. 725/14 |
| 8,526,626 B2 * | 9/2013 | Nielsen et al. .................. 381/58 |
| 8,738,763 B2 | 5/2014 | Crystal et al. |
| 2002/0068556 A1 | 6/2002 | Brown |
| 2002/0097885 A1 | 7/2002 | Birchfield et al. |
| 2002/0144259 A1 | 10/2002 | Gutta et al. |
| 2002/0150387 A1 | 10/2002 | Kunii et al. |
| 2002/0174425 A1 | 11/2002 | Markel et al. |
| 2002/0198762 A1 | 12/2002 | Donato |
| 2003/0033600 A1 | 2/2003 | Cliff et al. |
| 2003/0070182 A1 | 4/2003 | Pierre et al. |
| 2003/0093784 A1 | 5/2003 | Dimitrova et al. |
| 2003/0097302 A1 | 5/2003 | Overhultz et al. |
| 2003/0122708 A1 | 7/2003 | Percy et al. |
| 2003/0126593 A1 | 7/2003 | Mault |
| 2003/0136827 A1 | 7/2003 | Kaneko et al. |
| 2003/0146871 A1 | 8/2003 | Karr et al. |
| 2003/0171833 A1 | 9/2003 | Crystal et al. |
| 2003/0177488 A1 | 9/2003 | Smith et al. |
| 2003/0194004 A1 | 10/2003 | Srinivasan |
| 2003/0208754 A1 | 11/2003 | Sridhar et al. |
| 2003/0222819 A1 | 12/2003 | Karr et al. |
| 2003/0222820 A1 | 12/2003 | Karr et al. |
| 2004/0019675 A1 | 1/2004 | Hebeler, Jr. et al. |
| 2004/0025174 A1 | 2/2004 | Cerrato |
| 2004/0027271 A1 | 2/2004 | Schuster et al. |
| 2004/0122679 A1 | 6/2004 | Neuhauser et al. |
| 2004/0198386 A1 | 10/2004 | Dupray |
| 2004/0266457 A1 | 12/2004 | Dupray |
| 2005/0035857 A1 | 2/2005 | Zhang et al. |
| 2005/0141345 A1 | 6/2005 | Holm et al. |
| 2005/0144632 A1 | 6/2005 | Mears et al. |
| 2005/0172311 A1 | 8/2005 | Hjelt et al. |
| 2005/0200476 A1 | 9/2005 | Forr et al. |
| 2005/0201826 A1 | 9/2005 | Zhang et al. |
| 2005/0203798 A1 | 9/2005 | Jensen et al. |
| 2005/0204379 A1 | 9/2005 | Yamamori |
| 2005/0207592 A1 | 9/2005 | Sporer et al. |
| 2005/0216509 A1 | 9/2005 | Kolessar et al. |
| 2005/0234774 A1 | 10/2005 | Dupree |
| 2005/0243784 A1 | 11/2005 | Fitzgerald et al. |

(56) References Cited

U.S. PATENT DOCUMENTS

| | | |
|---|---|---|
| 2005/0244012 A1 | 11/2005 | Asada |
| 2005/0264430 A1 | 12/2005 | Zhang et al. |
| 2006/0053110 A1 | 3/2006 | McDonald et al. |
| 2006/0075421 A1 | 4/2006 | Roberts et al. |
| 2006/0168613 A1 | 7/2006 | Wood et al. |
| 2007/0011040 A1 | 1/2007 | Wright et al. |
| 2007/0266395 A1 | 11/2007 | Lee et al. |
| 2007/0288277 A1 | 12/2007 | Neuhauser et al. |
| 2007/0288476 A1 | 12/2007 | Flanagan, III et al. |
| 2007/0294057 A1 | 12/2007 | Crystal et al. |
| 2007/0294132 A1 | 12/2007 | Zhang et al. |
| 2007/0294705 A1 | 12/2007 | Gopalakrishnan et al. |
| 2007/0294706 A1 | 12/2007 | Neuhauser et al. |
| 2008/0101454 A1 | 5/2008 | Luff et al. |
| 2008/0204273 A1 | 8/2008 | Crystal et al. |
| 2009/0037575 A1 | 2/2009 | Crystal et al. |
| 2010/0199296 A1* | 8/2010 | Lee et al. ............. 725/14 |
| 2011/0019835 A1 | 1/2011 | Schmidt et al. |
| 2011/0091055 A1 | 4/2011 | Leblanc |
| 2012/0020486 A1 | 1/2012 | Fried et al. |
| 2012/0148058 A1 | 6/2012 | Chen |
| 2012/0148067 A1 | 6/2012 | Petersen et al. |
| 2012/0169359 A1 | 7/2012 | Kim et al. |
| 2012/0219156 A1 | 8/2012 | Ramaswamy et al. |
| 2013/0034244 A1 | 2/2013 | Van Raalte et al. |
| 2013/0160042 A1* | 6/2013 | Stokes et al. ............. 725/18 |
| 2013/0166050 A1 | 6/2013 | Duwenhorst |
| 2014/0007153 A1* | 1/2014 | Nielsen et al. ............. 725/18 |
| 2014/0250448 A1* | 9/2014 | Nielsen ............. 725/14 |
| 2014/0282640 A1* | 9/2014 | Nielsen ............. 725/9 |
| 2014/0282663 A1* | 9/2014 | Lee ............. 725/18 |

FOREIGN PATENT DOCUMENTS

| | | |
|---|---|---|
| JP | 2000307530 | 11/2000 |
| JP | 2010257278 | 11/2010 |
| JP | 2012507904 | 3/2012 |
| JP | 2012095014 | 5/2012 |
| KR | 20120067477 | 6/2012 |
| KR | 1020120131826 | 12/2012 |
| WO | 8810540 | 12/1988 |
| WO | 9111062 | 7/1991 |
| WO | 9411989 | 5/1994 |
| WO | 9731440 | 8/1997 |
| WO | 9955057 | 10/1999 |
| WO | 0131816 | 5/2001 |
| WO | 03087871 | 10/2003 |
| WO | 2004051303 | 6/2004 |
| WO | 2004051304 | 6/2004 |
| WO | 2006037014 | 4/2006 |
| WO | 2006096177 | 9/2006 |
| WO | 2006121681 | 11/2006 |

OTHER PUBLICATIONS

Streamline Media Inc., "Arbitron & Scarborough Unveil New Mall Shopper Audience Measurement," Jun. 22, 2007, retrieved from <http://www.radioink.com> (2 pages).

Yahoo Shopping, "Arkon Sound Feeder II FM Transmitter," 2002, retrieved from <http://store.yahoo.com/semsons-inc/arsounfeedii. html>, retrieved on Oct. 4, 2004 (2 pages).

MIT, "Cricket Project", "Cricket v2 User Manual," MIT Computer Science and Artificial Intelligence Lab, Cambridge, U.S.A., Jan. 2005 (57 pages).

Discovery Communications Inc., "Discovery Spy Motion Tracking System," 2004, retrieved from <http://shopping.discovery.com/stores/servlet/ProductDisplay?catalogId=10000&storeId=1000&lanId=-1&productId=53867&partnumber=689638>, retrieved on Oct. 14, 2004 (4 pages).

Dust Networks Inc., "Dust Networks—SmartMesh," 2002, retrieved from <http://www.dustnetworks.com/applications/main.html>, retrieved on Sep. 29, 2004 (2 pages).

Eltek Ltd., "Eltek GenII Radio Data Logging System," 2004, retrieved from <www.eltekdataloggers.co.uldtelemetry.html>, retrieved on Sep. 29, 2004 (4 pages).

Radio Shack, "FM Wireless Microphone Module Kits,"2004, retrieved from <http://www.horizonindustries.com/fm.htm>, retrieved on Sep. 30, 2004 (1 page).

Sonitor Technologies, "New Sonitor Patent Combines Ultrasound and RFID," Feb. 17, 2005, retrieved from <http://sonitor.com/news/article.asp?id=73>, retrieved on Jun. 13, 2005 (1 page).

National Institute of Standards and Technology, "NIST Location System," Wireless Communication Technologies Group, Mar. 12, 2004, retrieved from <http://www.antd.nist.gov>, retrieved on Nov. 1, 2004 (2 pages).

UCLA, "The Nibble Location System," May 21, 2001, retrieved from <http://mmsl.cs.ucla.edu/nibble/>, retrieved on Nov. 2, 2004 (13 pages).

Amplicon "UHF Radio Data Logging System—GenII Data Logger," 2004, retrieved from <http://www.amplicon.co.uk/dr-prod3.cfm/subsecid/10037/secid/1/groupid/11809.htm>, retrieved on Oct. 4, 2004 (3 pages).

Directions Media, "University Library Navigation Enabled by Ekahau," Directions Magazine, Jun. 12, 2003, retrieved from <http://www/directionsmag.com/press.releases/index.php?duty=Show&id=7276&trv=1> (3 pages).

Yahoo Shopping, "Worlds Smallest Hands Free Radio," 2004, retrieved from <http://store.yahoo.com/latesttrends/worsmalhanfr. html>, retrieved on Sep. 29, 2004 (1 page).

Exxun, "Xl Button Radio—The World's Smallest Radio," 2004, retrieved from <http://www.exxun.com>, retrieved on Sep. 29, 2004 (2 pages).

Azondekon et al., "Service Selection in Networks Based on Proximity Confirmation Using Infrared," International Conference on Telecommunications (ICT) Beijing, 2002, retrieved from <http://www.scs.carleton.ca/-barbeau/Publications/2002/azondekon.pdf> (5 Pages).

Bahl et al., "A Software System for Locating Mobile Users: Design, Evaluation, and Lessons," Technical Report MSR-TR-2000-12 Microsoft Research, Feb. 2000, retrieved from <http://research.microsoft.com/en-us/groups/nrg/radar.pdf> (13 pages).

Battelle Transportation Division, "GPS for Personal Travel Surveys; Lexington Area Travel Data Collection Test," Final Report for Office of Highway Information Management, Office of Technology Application and Federal Highway Administration, Sep. 15, 1997 (92 pages).

Bernstein et al., "An Introduction to Map Matching for Personal Navigation Assistants," New Jersey TIDE Center, New Jersey Institute ofTechnology, Aug. 1996 (17 pages).

Fang et al., "Design of a Wireless Assisted Pedestrian Dead Reckoning System—The NavMote Experience," Institute of Electrical and Electronics Engineers (IEEE), vol. 54, Issue 6, Dec. 2005 (16 pages).

Ferguson, Michael, "XTension Tech Notes," Sand Hill Engineering Inc., Dec. 10, 1998, retrieved from <http://www.shed.com/articles/TN.proximity.html>, retrieved on Jan. 12, 2004 (9 pages).

Gentile et al., "Robust Location using System Dynamics and Motion Constraints," National Institute of Standards and Technology, Wireless Communication Technologies Group, Jun. 24, 2004 (5 pages).

Handy et al., "Lessons Learned from Developing a Bluetooth Multiplayer-Game," 2nd International Conference on Pervasive Computing, Workshop on Gaming, retrieved from <http://www.ipsi.fraunhofer.de/ambiente/pervasivegaming/papers/Handy_Pervasive2004.pdf> (7 pages).

Holm, Sverre, "Technology Presentation," Sonitor Technologies, May 26, 2004, retrieved from <http://www.sonitor.com/news/article.asp?id=62>, retrieved on Oct. 13, 2004 (16 pages).

Kanellos, Michael. "Dust Makes Mesh of Wireless Sensors," CNET News.com, Sep. 20, 2004, retrieved from <http://www.news.com/Dust-makes-mesh-of-wireless-sensors/2100-1008_35374971. html?tag=item>, retrieved on Sep. 29, 2004 (2 pages).

Kerschbaumer, Ken, "Who's Really Watching?" Pricewaterhouse Coopers Global Entertainment and Media Outlook 2004-2008, May 16, 2005 (4 pages).

McCarthy et al., "RF Free Ultrasonic Positioning (Presentation)," 7th International Symposiom on Wearable Computers, Oct. 2003 (12 pages).

(56) References Cited

OTHER PUBLICATIONS

McCarthy et al., "RF Free Ultrasonic Positioning," Department of Computer Science, University of Bristol, U.K., 2003 (7 pages).

International Searching Authority, "International Search Report," issued in connection with International Patent Application No. PCT/US2014/018921, Jun. 27, 2014 (5 pages).

International Searching Authority, "International Search Report and Written Opinion," issued in connection with International Patent Application No. PCT/US2005/34743, mailed Oct. 31, 2006 (11 pages).

International Searching Authority, "International Preliminary Report on Patentability", issued in connection with International Patent Application No. PCT/US2005/34743, mailed Apr. 5, 2007 (9 pages).

International Searching Authority, "Written Opinion," issued in connection with International Patent Application No. PCT/US2014/018921, Jun. 27, 2014 (6 pages).

Schuman, Evan. "A Smarter Smart Cart?" Storefront Backtalk, Feb. 16, 2005, retrieved from <http://www.storefrontbacktalk.com>, retrieved on Nov. 20, 2006 (5 pages).

United States Patent and Trademark Office, "Final Rejection," issued in connection with U.S. Appl. No. 11/692,087, mailed Oct. 30, 2009 (15 pages).

United States Patent and Trademark Office, "Non-Final Office Action," issued in connection with U.S. Appl. No. 11/692,087, mailed May 13, 2009 (11 pages).

United States Patent and Trademark Office, "Notice of Allowance," issued in connection with U.S. Appl. No. 11/692,087, mailed Jan. 12, 2010 (8 pages).

Yeung et al., "A Comparative Study on Location Tracking Strategies in Cellular Mobile Radio Systems," Global Telecommunications Conference, 1995. Globecom '95, IEEE, Nov. 14-26, 1995 (7 pages).

United States Patent and Trademark Office, "Non-Final Office Action," issued in connection with U.S. Appl. No. 14/500,443, mailed May 28, 2015 (14 pages).

United States Patent and Trademark Office, "Notice of Allowance," issued in connection with U.S. Appl. No. 13/791,432, mailed Apr. 10, 2015 (10 pages).

Battiti et al. "Location-Aware Computing: a Neutral Network Model for Determining Location in Wireless LANS" University of Trento: Department of Information and Communication Technology, Technical Report #DIT-02-0083, Feb. 2002 (pp. 1-16).

\* cited by examiner

Calculate cell parameters for each demographic group $$AVP = \frac{\Sigma \text{ Weighted Visitor Exposure Minutes for demographic of interest}}{\Sigma \text{ Weighted Household Tuning Minutes}}$$

Example: Calculate cell parameters for Female 6-11 and Male 55-64

| Possible Visitor? | Female 6-11 | Male 55-64 |
|---|---|---|
| Tuning Characteristics | Watching Disney using M-F 12:30 - 5 PM daypart | |
| HH Characteristics | Older Family Life Stage, 2 TV sets | |
| Visitor Exposure Minutes | 3,892 | 1,081 |
| HH Tuning Minutes | 3,109 | 3,109 |
| Visitor Parameters | (3,892/3,109) = 1.252 | (1,081/3,109) = .348 |

Note that 1.252 and .348 are themselves the AVPs (not probabilities) that are later used to calculate probability values with the Poisson Distribution

FIG. 12

| CATEGORY OF INTEREST | VISITOR EXPOSURE MINUTES 1302 | HOUSEHOLD TUNING MINUTES 1304 |
|---|---|---|
| LIFE STAGE = OLDER FAMILY | 443,940 1306 | 733,317 1308 |
| TV SETS = 2 | 150,844 1310 | 285,877 1312 |
| TOTAL MINUTES | 1,741,474 | 8,200,347 |

EXPOSURE PROPORTION FOR LIFE STAGE = OLDER FAMILY

$$= \frac{\text{Visitor Exposure Min.}}{\text{Total Exposure Min.}} = \frac{443{,}940}{1{,}741{,}474} = \boxed{0.255} \quad \text{— 1318}$$

TUNING PROPORTION FOR LIFE STAGE = OLDER FAMILY

$$= \frac{\text{HH Tuning Min.}}{\text{Total Tuning Min.}} = \frac{733{,}317}{8{,}200{,}347} = \boxed{0.089} \quad \text{— 1322}$$

EXPOSURE PROPORTION FOR TV SETS = 2

$$= \frac{\text{Visitor Exposure Min.}}{\text{Total Exposure Min.}} = \frac{150{,}844}{1{,}741{,}474} = \boxed{0.087} \quad \text{— 1320}$$

TUNING PROPORTION FOR TV SETS = 2

$$= \frac{\text{HH Tuning Min.}}{\text{Total Tuning Min.}} = \frac{285{,}877}{8{,}200{,}347} = \boxed{0.035} \quad \text{— 1324}$$

1314                    1316

Expected Exposure Min. = (Tot. Exp. Min)*(Exp. Proportion 1)*(Exp. Proportion n)
= (1,741,474)*(0.255)*(0.087) = $\boxed{38{,}635}$  ⎫ 1326

Expected Tuning Min. = (Tot. Tun. Min)*(Tun. Proportion 1)*(Tun. Proportion n)
= (8,200,347)*(0.089)*(0.035) = $\boxed{25{,}544}$  ⎫ 1328

$$\text{AVP} = \frac{38{,}635}{25{,}544} = \boxed{1.504} \quad \text{⎫ 1330}$$

FIG. 13

METHODS AND APPARATUS TO CHARACTERIZE HOUSEHOLDS WITH MEDIA METER DATA

RELATED APPLICATION

This application claims the benefit of U.S. Provisional Application Ser. No. 61/839,344, which was filed on Jun. 25, 2013, U.S. Provisional Application Ser. No. 61/844,301, which was filed on Jul. 9, 2013, U.S. Provisional Application Ser. No. 61/986,409, which was filed on Apr. 30, 2014, and U.S. Provisional Application Ser. No. 62/007,535, which was filed on Jun. 4, 2014, all of which are hereby incorporated herein by reference in their entireties.

FIELD OF THE DISCLOSURE

This disclosure relates generally to market research, and, more particularly, to methods and apparatus to characterize households with media meter data.

BACKGROUND

In recent years, panelist research efforts included installing metering hardware in qualified households that fit one or more demographics of interest. In some cases, the metering hardware is capable of determining whether a media presentation device (such as a television set) is powered on and tuned to a particular station via a hardwired connection from the media presentation device to the meter. In other cases, the metering hardware is capable of determining which household member is exposed to a particular portion of media via one or more button presses on a People Meter by the household member near the television.

BRIEF DESCRIPTION OF THE DRAWINGS

FIG. 12 are example cell parameter calculations including example demographics of interest and example categories of interest to determine average visitor parameters to be used to impute a number of visitors.

FIG. 13 are example independent parameter calculations to determine average visitor parameters to be used to impute a number of visitors.

DETAILED DESCRIPTION

Figure 1:
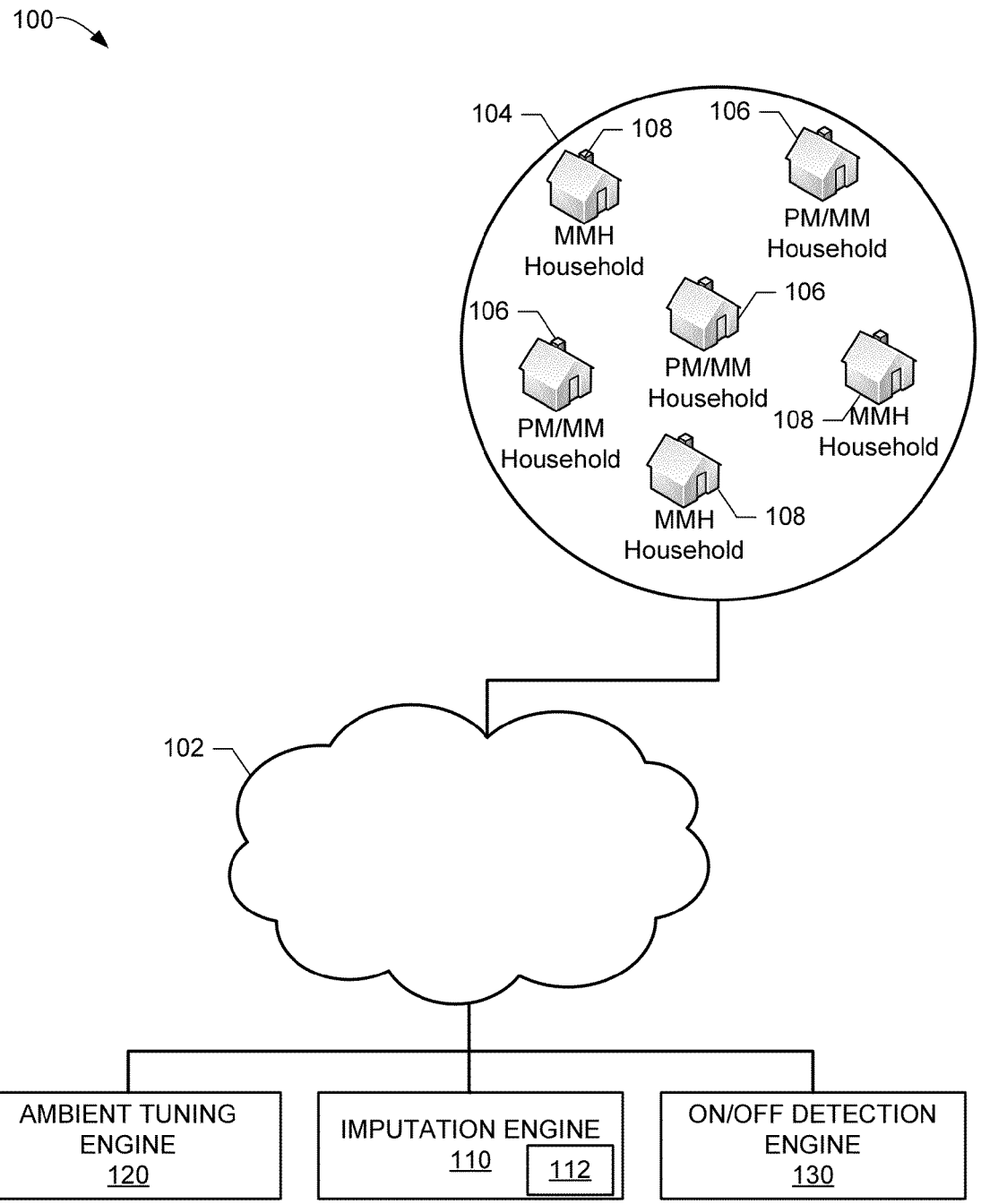
FIG. 1 illustrates an example media distribution environment in which households may be characterized with media meter data.

Market researchers seek to understand the audience composition and size of media, such as radio programming, television programming and/or Internet media so that advertising prices can be established that are commensurate with audience exposure and demographic makeup (referred to herein collectively as "audience configuration"). As used herein, "media" refers to any sort of content and/or advertisement which is presented or capable of being presented by an information presentation device, such as a television, radio, computer, smart phone or tablet. To determine aspects of audience configuration (e.g., which household member is currently watching a particular portion of media and the corresponding demographics of that household member), the market researchers may perform audience measurement by enlisting any number of consumers as panelists. Panelists are audience members (household members) enlisted to be monitored, who divulge and/or otherwise share their media exposure habits and demographic data to facilitate a market research study. An audience measurement entity typically monitors media exposure habits (e.g., viewing, listening, etc.) of the enlisted audience members via audience measurement system(s), such as a metering device and a People Meter. Audience measurement typically involves determining the identity of the media being displayed on a media presentation device, such as a television.

Some audience measurement systems physically connect to the media presentation device, such as the television, to identify which channel is currently tuned by capturing a channel number, audio signatures and/or codes identifying (directly or indirectly) the programming being displayed. Physical connections between the media presentation device and the audience measurement system may be employed via an audio cable coupling the output of the media presentation device to an audio input of the audience measurement system. Additionally, audience measurement systems prompt and/or accept audience member input to reveal which household member is currently exposed to the media presented by the media presentation device.

As described above, audience measurement entities may employ the audience measurement systems to include a device, such as the People Meter (PM), having a set of inputs (e.g., input buttons) that are each assigned to a corresponding member of a household. The PM is an electronic device that is typically disposed in a media exposure (e.g., viewing) area of a monitored household and is proximate to one or more of the audience members. The PM captures information about the household audience by prompting the audience members to indicate that they are present in the media exposure area (e.g., a living room in which a television set is present) by, for example, pressing their assigned input key on the PM. When a member of the household selects their corresponding input, the PM identifies which household member is present, which includes other demographic information associated with the household member, such as a name, a gender, an age, an income category, etc. However, in the event a visitor is present in the household, the PM includes at least one input (e.g., an input button) for the visitor to select. When the visitor input button is selected, the PM prompts the visitor to enter an age and a gender (e.g., via keyboard, via an interface on the PM, etc.).

The PM may be accompanied by a base metering device (e.g., a base meter) to measure one or more signals associated with the media presentation device. For example, the base meter may monitor a television set to determine an operational status (e.g., whether the television is powered on or powered off, a media device power sensor), and/or to identify media displayed and/or otherwise emitted by the media device (e.g., identify a program being presented by a television set). The PM and the base meter may be separate devices and/or may be integrated into a single unit. The base meter may capture audience measurement data via a cable as described above and/or wirelessly by monitoring audio and/or video output by the monitored media presentation device. Audience measurement data captured by the base meter may include tuning information, signatures, codes (e.g., embedded into or otherwise broadcast with broadcast media), and/or a number of and/or identification of corresponding household members exposed to the media output by the media presentation device (e.g., the television).

Data collected by the PM and/or the base meter may be stored in a memory and transmitted via one or more networks, such as the Internet, to a data store managed by a market research entity such as The Nielsen Company (US), LLC. Typically, such data is aggregated with data collected from a large number of PMs and/or base meters monitoring a large number of panelist households. Such collected and/or aggregated data may be further processed to determine statistics associated with household behavior in one or more geographic regions of interest. Household behavior statistics may include, but are not limited to, a number of minutes a household media device was tuned to a particular station, a number of minutes a household media device was used (e.g., viewed) by a household panelist member and/or one or more visitors, demographics of an audience (which may be statistically projected based on the panelist data) and instances when the media device is on or off. While examples described herein employ the term "minutes," such as "household tuning minutes," "exposure minutes," etc., any other time measurement of interest may be employed without limitation.

To ensure audience measurement systems are properly installed in panelist households, field service personnel have traditionally visited each panelist household, assessed the household media components, physically installed (e.g., connected) the PM and/or base meter to monitor a media presentation device(s) of the household (e.g., a television), and trained the household members how to interact with the PM so that accurate audience information is captured. In the event one or more aspects of the PM and/or base meter installation are inadvertently disrupted (e.g., an audio cable connection from the media device to the base meter is disconnected), then subsequent field service personnel visit(s) may be necessary. In an effort to allow collected household data to be used in a reliable manner (e.g., a manner conforming to accepted statistical sample sizes), a relatively large number of PMs and/or base meters are needed. Each such PM and/or base meter involves one or more installation efforts and installation costs. As such, efforts to increase statistical validity (e.g., by increasing panel size and/or diversity) for a population of interest result in a corresponding increase in money spent to implement panelist households with PMs and/or base meters.

In an effort to increase a sample size of household behavior data and/or reduce a cost associated with configuring panelist households with PMs and/or base meters, example methods, apparatus, systems and/or articles of manufacture disclosed herein employ a media meter (MM) to collect household panelist behavior data. Example MMs disclosed herein are distinguished from traditional PMs and/or base meters that include a physical connection to the media presentation device (e.g., a television). In examples disclosed herein, the MM captures audio without a physical connection to the media device. In some examples, the MM includes one or more microphones to capture ambient audio in a room shared by the media device. In some such examples, the MM captures codes embedded by one or more entities (e.g., final distributor audio codes (FDAC)), and does not include one or more inputs that are to be selected by one or more household panelists to identify which panelist is currently viewing the media device. Rather than collecting audience composition data directly from panelists, example methods, apparatus, systems and/or articles of manufacture disclosed herein apply one or more models to impute which household members are exposed to particular media programming to collected MM data. Such example imputation techniques are described in further detail below and referred to herein as "persons imputation." Additionally, example methods, apparatus and/or articles of manufacture disclosed herein apply one or more models to impute a number of visitors in each household and corresponding age/demographic characteristics of such visitors. In other words, examples disclosed herein facilitate a manner of determining a probability of household exposure activity, a number of visitors and/or corresponding visitor ages in a stochastic manner that avoids the expense of additional PM device installation in panelist households.

In some examples, a household includes two or more media devices, such as a first television located in a first room and a second television located in a second room. In the event the panelist household includes first and second meters physically connected to the first and second televisions, then the physical connection unambiguously identifies which audio data is originating from which television in the household, even if such audio from the first television propagates to the second room having the second television (and/or vice versa). Circumstances in which media played in one room can be heard and/or otherwise detected in another room (which may also have a media presentation device and accompanying meter) are referred to herein as "spillover." In the event the panelist household includes first and second MMs located in the first and second rooms, respectively, then spillover audio data "heard" (detected) from the first room may erroneously be credited by the second MM as media presented in the second room (and/or vice versa). Media tuning events logged by a MM as occurring in one room, but actually occurring in a second different room (e.g., due to spillover) are referred to herein as "ambient tuning." In other words, because the MM includes microphones to collect audio emitted from media devices, the possibility exists that the first MM in the first room is picking-up and/or otherwise detecting audio from the media device in an adjacent (e.g., the second) room. Ambient tuning is distinguished from "real tuning" in that real tuning occurs when the MM properly credits the media presentation device (e.g., television) associated with the room in which the MM is located with a media exposure for media actually presented on that media presentation device. Example methods, apparatus, systems and/or articles of manufacture disclosed herein apply models to identify instances of ambient tuning (e.g., due to spillover) as distinguished from real (legitimate) tuning. Similarly, example methods, apparatus, systems and/or articles of manufacture disclosed herein apply models to identify instances of when a media presentation device is turned on as distinguished from instances of when the media device is powered off. This is important in avoiding crediting of media exposure when no such exposure is occurring. For example, in the event a household member is in a first room with an associated media presentation device in a powered-off state, but the associated meter in that first room is detecting audio from a second media device in a second room, examples disclosed herein identify the occurrence as spillover and do not credit the detection as an actual media exposure.

Turning to FIG. 1, an example media distribution environment 100 includes a network 102 (e.g., the Internet) communicatively connected to panelist households within a region of interest (e.g., a target research geography 104). In the illustrated example of FIG. 1, some panelist households 106 include People Meters (PMs) and media meters (MMs) 106 and some other panelist households 108 include only MMs to capture household media exposure information. Households having both MMs and PMs are referred to herein as MMPM households 106. Households that do not have a PM, but have a MM are referred to herein as MMHs (media meter households) 108. Behavior information collected by the example MMPMs 106 and the example MMHs 108 are sent via the example network 102 to an example imputation engine 110, an example visitor imputation engine, an example ambient tuning engine 120, and/or an example on/off detection engine 130 for analysis. As described above, because MMHs 108 do not include PMs, they do not include physical button inputs to be selected by household members to identify which household member is currently watching particular media, and they do not include physical button inputs to be selected by household visitors to identify age and/or gender information. Therefore, example methods, systems, apparatus and/or articles of manufacture disclosed herein model household characteristics that predict a likelihood that a particular household member is watching the identified media being accessed in the MMHs 108.

Example households that include a PM collect panelist audience data. As used herein, "panelist audience data" includes both (a) media identification data (e.g., code(s) embedded in or otherwise transmitted with media, signatures, channel tuning data, etc.) and (b) person information identifying the corresponding household member(s) and/or visitors that are currently watching/viewing/listening to and/or otherwise accessing the identified media. On the other hand, MMH households 108 include only a MM to collect media data. As used herein, "media data" and/or "media identifier information" are used interchangeably and refer to information associated with media identification (e.g., codes, signatures, etc.), but does not include person information identifying which household member(s) and/or visitors are currently watching/viewing/listening to and/or otherwise accessing the identified media. As described in further detail below, example methods, apparatus, systems and/or articles of manufacture disclosed herein impute person identifying data to media data collected from MMH household(s) 108.

Although examples disclosed herein refer to code readers and collecting codes, techniques disclosed herein could also be applied to systems that collect signatures and/or channel tuning data to identify media. Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be transmitted with, inserted in, or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A good signature is one that is repeatable when processing the same media presentation, but that is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

Persons Imputation

Figure 2:
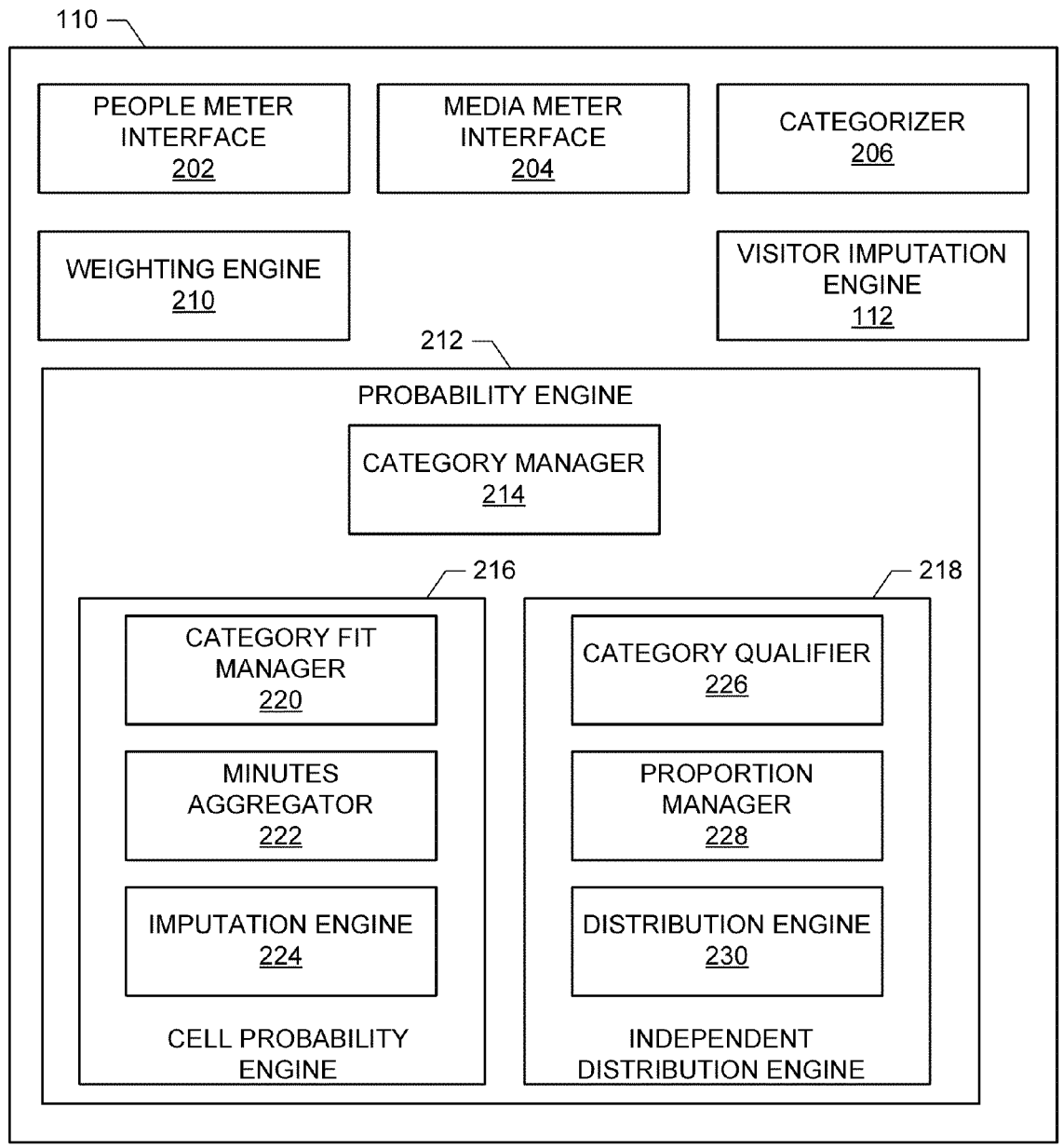
FIG. 2 is a schematic illustration of an example imputation engine constructed in accordance with the teachings of this disclosure.

FIG. 2 is a schematic illustration of an example implementation of the imputation engine 110 of FIG. 1. In the illustrated example of FIG. 2, the imputation engine 110 includes the visitor imputation engine 112, a People Meter (PM) interface 202, a media meter (MM) interface 204, a categorizer 206, a weighting engine 210 and a probability engine 212. As described in further detail below, the example visitor imputation engine 112 employs one or more portions of the example imputation engine 110. The example probability engine 212 of FIG. 2 includes an example dimension manager 214, an example cell probability engine 216 and an example independent distribution engine 218. The example cell probability engine 216 of FIG. 2 includes an example category fit manager 220, an example minutes aggregator 222 and an example imputation engine 224. The example independent distribution engine 218 of FIG. 2 includes an example category qualifier 226, an example proportion manager 228 and an example distribution engine 230.

In operation, the example PM interface 202 acquires people meter data from any and all PMs within the example panelist households 104. In particular, the example PM interface 202 acquires PM data from the PM devices located in the example MMPM households 106 (i.e., households that have both MM devices and PM devices). The PM devices have input(s) (e.g., buttons for each household member to select to identify their respective presence in the audience currently exposed to media). In some examples, the MMPM households 106 are associated with a particular geographic area of focus, such as nationwide (sometimes referred to as a "National People Meter" (NPM)), while in other examples the MMPM households 106 are associated with a subset of a particular geographic area of focus, such as a localized geography of interest (e.g., a city within a nation (e.g., Chicago), and sometimes referred to as "Local People Meter" (LPM)).

For example, in the event an analysis of the Charlotte designated market area (DMA) is desired, then the example PM interface 202 captures data from LPM households within a time zone corresponding to the desired DMA (e.g., the Eastern time zone). In some examples, desired data may be streamed back to one or more storage repositories, from which the example imputation engine 110, the example ambient tuning engine 120 and/or the example on/off detection engine 130 may retrieve the data. The example PM interface 202 of the illustrated examples collects, acquires and/or otherwise captures PM data (panelist audience data) from panelist households 104 (having both PMs and MMs) and records or aggregates the media exposure minutes to respective persons within the household as one or more of the possible audience members (e.g., viewers) of the corresponding media. In other words, the captured panelist audience data is at a persons-level rather than at a household level, which facilitates an ability to generate person probabilities, as described in further detail below.

The example categorizer 206 of FIG. 2 categorizes the acquired panelist audience data in any number of categories, such as by age, by gender, by whether a household is of size one (e.g., a single person household) or of size two or more (e.g., two or more persons in the household), by a station/affiliate, by a genre and/or by daypart. In some examples, categories include those related to race, ethnicity, geography, language, metro vs. non-metro, etc. In still other examples, categories include an age of the head of household, a room location (e.g., a living room, a master bedroom, other bedroom, etc.), and/or the presence of children. In the event one or more categories improve results, it may be used for analysis, while categories that do not illustrate improvements or cause negative impacts may be removed during the analysis.

As used herein, categories refer to classifications associated with collected exposure minutes (also known as "viewing minutes"). Categories may include, but are not limited to, a daypart associated with collected exposure minutes (e.g., Monday through Friday from 5:00 AM to 6:00 AM, Sunday from 10:00 PM to 1:00 AM, etc.), a station associated with collected exposure minutes (e.g., WISN, WBBM, etc.), an age/gender associated with collected exposure minutes (e.g., males age 2-5, females age 35-44, etc.), and a genre (e.g., kids programs, home repair programs, music programs, sports programs, etc.) associated with collected exposure minutes. In still other examples, the categorizer 206 categorizes the acquired panelist audience data by education (e.g., 8 years or less, 9 years to high school graduate, some college to Bachelor degree, master's degree or higher, etc.), life stage (e.g., pre-family, young family, older family, post family, retired, etc.) and/or a number of media presentation devices (e.g., television sets in the household. One or more combinations of station/affiliate/genre/demographic attribute(s) may be categorized in different ways based on, for example, variations between data available for one or more age/gender levels. For example, some local markets have ten stations in which a sample size for men age 45-54 may exhibit a data sample size of statistical significance for seven of those ten stations. In other examples, a local market may have relatively fewer stations where the age/gender levels are of sufficient size to support statistical significance. In some such examples, the age/gender groupings are adjusted (e.g., from males age 40-45 to males age 40-50) to increase an available sample size to achieve a desired statistical significance.

To impute panelist audience data (e.g., exposure minutes, which is sometimes referred to herein as "viewing minutes") to media data, the example PM interface 202 identifies Local People Meter (LPM) data that has been collected within a threshold period of time. On a relative scale, when dealing with, for example, television exposure, an exposure index, which provides an indication of how well LPM data accurately imputes exposure minutes, may be computed in a manner consistent with Equation (1).

$$\text{Exposure Index} = \frac{\text{No. of imputed } LPM \text{ exposure min. for ea. cat.}}{\text{No. of actual } LPM \text{ exposure min. for ea. cat.}} \quad \text{Equation (1)}$$

In the illustrated example of Equation (1), the exposure index is calculated as the ratio of the number of imputed LPM viewing minutes for each category of interest and the number of actual LPM viewing minutes for each category of interest.

Figure 3:
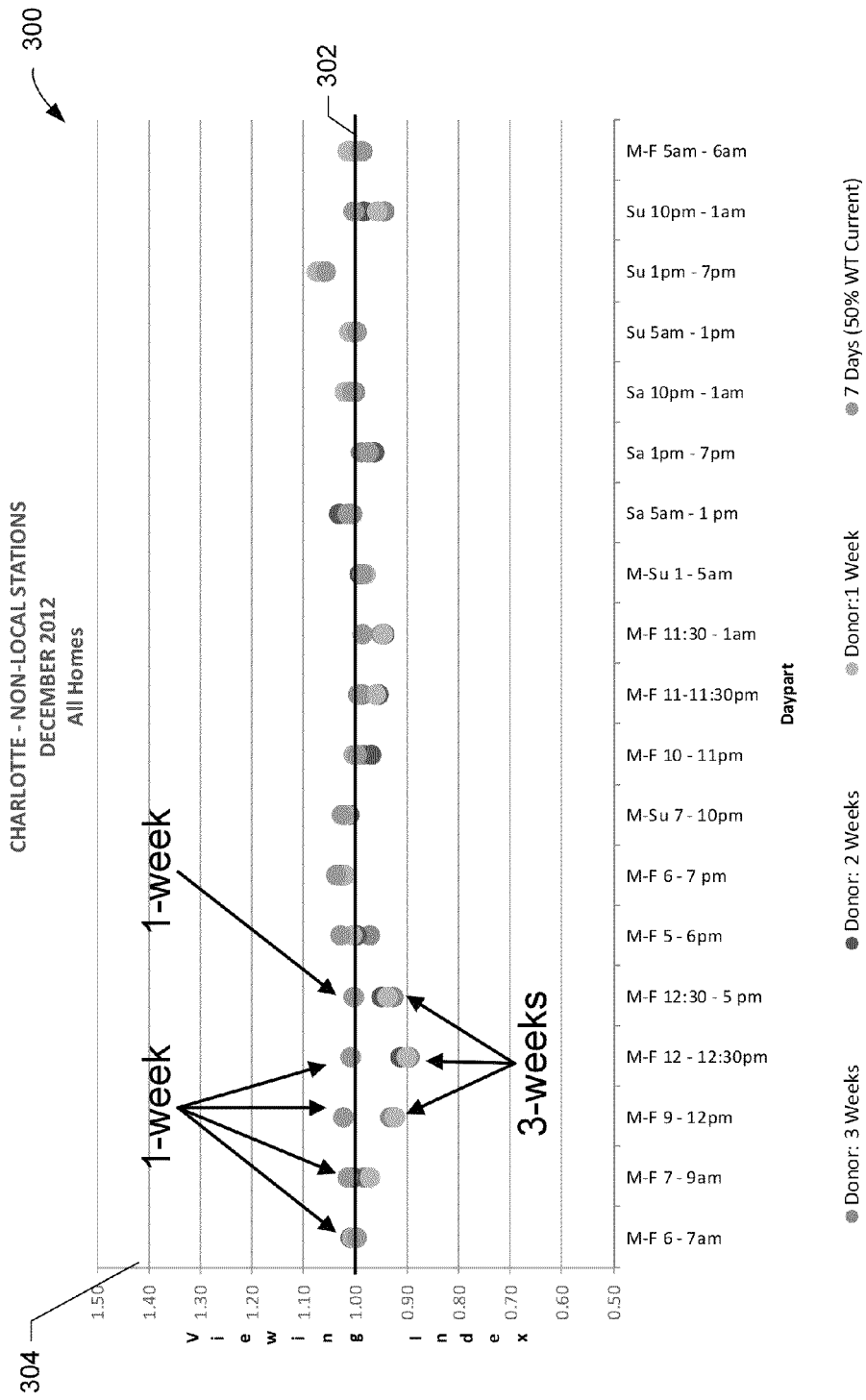
FIG. 3 is a plot illustrating an example viewing index effect based on an age of collected data.

The example exposure index of Equation (1) may be calculated on a manual, automatic, periodic, aperiodic and/or scheduled basis to empirically validate the success and/or accuracy of imputation efforts disclosed herein. Index values closer to one (1) are indicative of a greater degree of accuracy when compared to index values that deviate from one (1). Depending on the type of category associated with the collected exposure minutes, corresponding exposure index values may be affected to a greater or lesser degree based on the age of the collected data. FIG. 3 is an example plot 300 of exposure index values by daypart. In the illustrated example of FIG. 3, the plot 300 includes an x-axis of daypart values 302 and a y-axis of corresponding exposure index values 304. Index value data points labeled "1-week" appear to generally reside closer to index values of 1.00, while index value data points labeled "3-weeks" appear to generally reside further away from index values of 1.00. In other words, panelist audience data that has been collected more recently results in index values closer to 1.00 and, thus, reflects an imputation accuracy better than panelist audience data that has been collected from longer than 1-week ago.

As described above, collected data that is more recent exhibits an imputation accuracy that is better than an imputation accuracy that can be achieved with relatively older collected data. Nonetheless, some data that is relatively older will still be useful, but such older data is weighted less than data that is more recent to reflect its lower accuracy. The example weighting engine 210 applies a temporal weight, and applies corresponding weight values by a number of days since the date of collection. Relatively greater weight values are applied to data that is relatively more recently collected. In some examples, weight values applied to collected tuning minutes and collected exposure minutes are based on a proportion of a timestamp associated therewith. For instance, a proportionally lower weight may be applied to a portion of collected minutes (e.g., tuning minutes, exposure minutes) when an associated timestamp is relatively older than a more recently collection portion of minutes.

Figure 4:
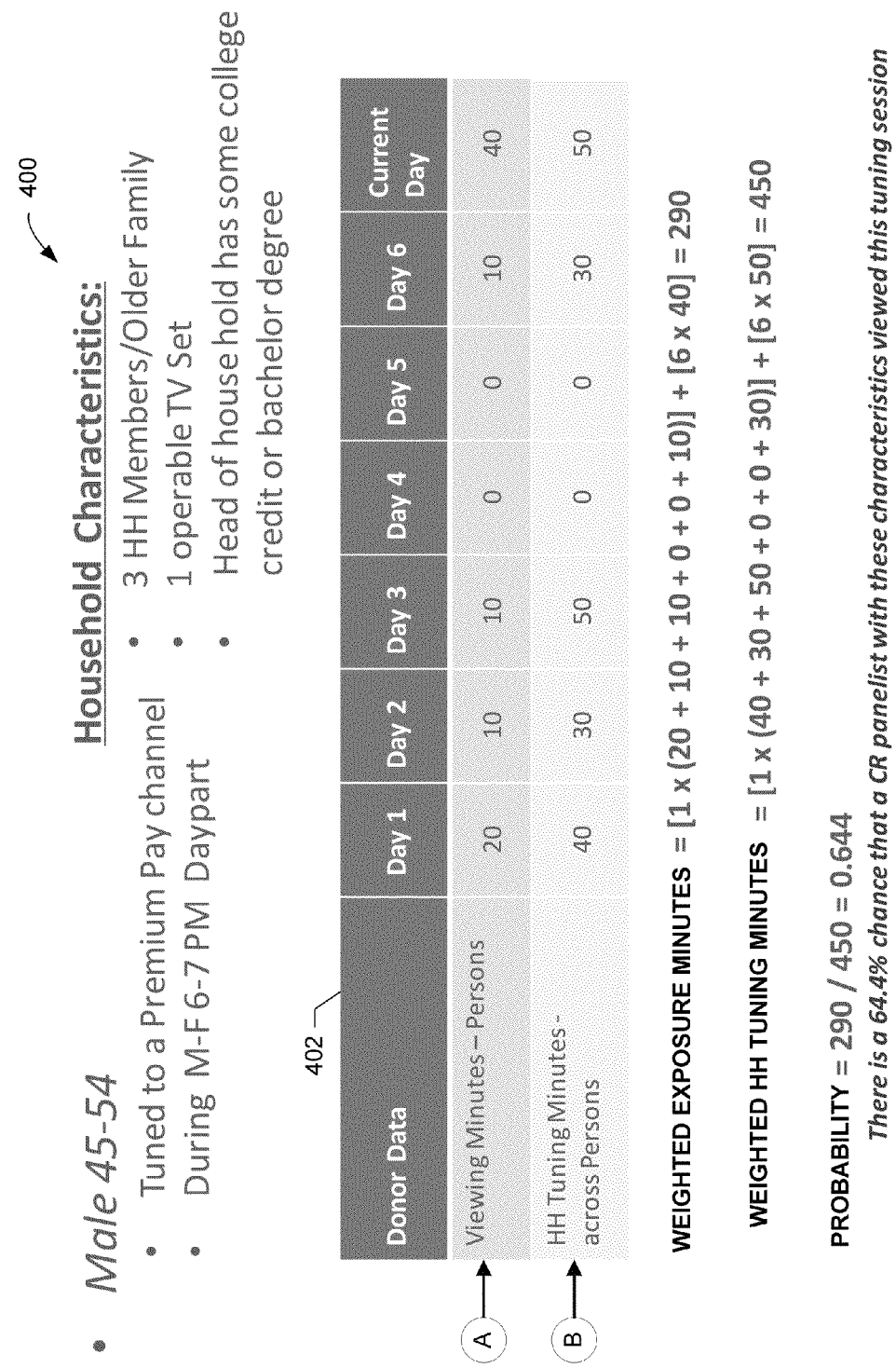
FIG. 4 is an example weighting allocation table to apply a temporal weight to collected minutes.

FIG. 4 illustrates an example weighting allocation table 400 generated and/or otherwise configured by the example weighting engine 210. In the illustrated example of FIG. 4, a MMPM household 106 acquired exposure minutes (i.e., individualized panelist audience data) via a PM device (row "A"), and acquired household tuning minutes (i.e., minutes tuned in a household without individualizing to a specific person within that household) via a MM device (row "B"). The example individualized panelist audience and household tuning minutes are collected over a seven (7) day period. In that way, the most recent day (current day 402) is associated with a weight greater than any individualized panelist audience and/or household tuning minutes from prior day(s). The example individualized panelist minutes of row "A" may be further segmented in view of a desired category combination for a given household. As described above, categories that characterize a household may include a particular age/gender, size of household, viewed station, daypart, number of televisions, life stage, education level and/or other demographic attribute(s). For purposes of illustration, examples described below, the household age/gender category for the household is male, age 45-54, the tuned station is associated with a premium pay channel (genre) during the daypart associated with Monday through Friday between 6:00 PM and 7:00 PM.

In the illustrated example of FIG. 4, the weighting engine 210 applies a unitary weight value to the first six (6) days of individualized panelist minutes and household tuning minutes, and applies a weight value of six (6) to the most current day. While a value of six (6) is disclosed above, like the other values used herein, such value is used for example purposes and is not a limitation. In operation, the example weighting engine 210 of FIG. 2 may employ any weighting value in which the most current day value is relatively greater than values for one or more days older than the current day. The example weighting engine 210 may generate a weighted sum of the collected individualized panelist audience exposure minutes (hereinafter referred to herein as "exposure minutes") in a manner consistent with example Equation (2), and may generate a weighted sum of the collected household tuning minutes in a manner consistent with example Equation (3).

$$\text{Exposure Min.} = \left[W_1\left(\sum_{d=1}^{n} EM_d\right)\right] + [W_2 EM_c] \quad \text{Equation (2)}$$

$$\text{Tuning Min.} = \left[W_1\left(\sum_{d=1}^{n} TM_d\right)\right] + [W_2 TM_c] \quad \text{Equation (3)}$$

In the illustrated examples of Equation (2) and Equation (3), $W_1$ reflects a relatively lower weighting value than $W_2$, in which $W_2$ is the weighting value associated with the current day exposure minutes value. Additionally, d reflects one of n days of the collected data prior to the current day, $EM_d$ reflects exposure minutes for corresponding days prior to the current day, $TM_d$ reflects household tuning minutes for corresponding days prior to the current day, $EM_c$ reflects exposure minutes for the current day, and $TM_c$ reflects household tuning minutes for the current day.

In connection with example data shown in the illustrated example of FIG. 4 (e.g., days one through six having 20, 10, 10, 0, 0 and 10 exposure minutes, respectively, the current day having 40 exposure minutes, days one through six having 40, 30, 50, 0, 0 and 30 household tuning minutes and the current day having 50 household tuning minutes), application of example Equation (2) results in a weighted exposure minutes value of 290 and application of example Equation (3) results in a weighted household tuning minutes value of 450. In some examples, the probability engine 212 calculates an imputation probability that a MM panelist (e.g., a panelist household with only a MM device and no associated PM device) with the aforementioned category combination of interest (e.g., male, age 45-54 tuned to a premium pay channel during Monday through Friday between the daypart of 6:00 PM and 7:00 PM) is actually viewing this tuning session. The imputation probability is calculated by the example probability engine 212 by dividing the weighted exposure minutes (e.g., 290 minutes) by the weighted household tuning minutes (e.g., 450 minutes) to yield a 64.4% chance that the MM panelist with this same household category combination is associated with this tuning behavior. While examples disclosed herein refer to probability calculations, in some examples odds may be calculated to bound results between values of zero and one. For example, odds may be calculated as a ratio of a probability value divided by (1−Probability). If desired, the odds may be converted back to a probability representation.

However, while the market researcher may have a particular category combination of interest, a corresponding probability value accuracy may be improved when different probability calculation techniques are applied in view of corresponding available sample sizes of households sharing the particular category combination of interest. As described in further detail below, if collected LPM data associated with the category combination of interest (e.g., male, age 45-54, tuned to premium channel during 6:00 PM to 7:00 PM with three household members, one television and the head of household have some college credit or a bachelor's degree) is greater than a threshold value, then a cell probability technique may yield a probability value with acceptable accuracy. As used herein, an acceptable accuracy relates to a sample size that is capable and/or otherwise required to establish results having a statistical significance. However, in the event the collected Local People Meter (LPM) data associated with the category combination of interest falls below the threshold value, then the cell probability technique yields unacceptably low probability value accuracy. Instead, example methods, apparatus, systems and/or articles of manufacture disclosed herein employ independent distribution probability calculations when the collected LPM data associated with the category combination of interest is below a threshold value, such as below a threshold value that is capable of facilitating one or more calculations to yield results having statistical significance.

The example category manager 214 of FIG. 2 identifies categories and/or a category combinations of interest and determines whether the particular category combination of interest has a threshold number of households within a donor pool. As described above, the donor pool may be a localized geography (a Local People Meter (LPM), such as the panelist households within the geographic region of interest 104). However, as a geographic region of interest decreases in size, a corresponding number of qualifying households that match the category combination of interest also decreases. In some cases, the number of qualifying households is below a threshold value, which causes one or more traditional probability calculation methods (e.g., cell probability) to exhibit poor predictive abilities and/or results that fail to yield statistical significance. On the other hand, in the event the donor pool of households exceeds a threshold value count, then such traditional probability calculation methods (e.g., cell probability) exhibit satisfactory predictive capabilities under industry standard(s).

In operation, the example category manager 214 of FIG. 2 generates a logical "AND" condition test for a set of categories of interest. For example, if the categories of interest include (1) a particular station, (2) a particular daypart, (3) a particular number of household members, (4) a particular age, (5) a particular gender, (6) a particular number of television sets in the household, (7) a particular education level of the head of household, and (8) a particular life stage, then the category manager 214 determines whether the combination of all eight categories of interest are represented by a threshold number of households within the donor pool. If so, then the example category manager 214 invokes the example cell probability engine 216 to calculate a probability value of the category combination occurring within MMH households 108. Generally speaking, when a number of households sharing the combination of categories of interest (e.g., items (1) through (8) above) are greater than the threshold value, a corresponding level of confidence in probability calculation via the cell probability technique is deemed satisfactory.

In the event a market researcher seeks probability information for a male aged 50 watching a premium pay channel between the hours of 6:00 PM and 6:30 PM, the example category fit manager 220 of the illustrated example identifies which previously established category groups already exist that would best fit this desired task. In other words, the specific and/or otherwise unique research desires of the market researcher may not align exactly with existing categorical groups collected by LPM and/or NPM devices. Instead, the example category fit manager 220 identifies that the closest categorical combination of industry standard and/or otherwise expected data is with males age 45-54 between the hours of 6:00 PM and 7:00 PM. The example minutes aggregator 222 of the illustrated example identifies a total number of household tuning minutes in all households associated with the identified closest categorical combination, and also identifies a total number of exposure minutes associated with the males age 45-54 in such households. For example, the minutes aggregator 222 may identify forty-five (45) qualifying households that have males 45-54 (e.g., the household could have more than just the males 45-54) in which a premium pay genre station was tuned between the hours of 6:00 PM to 7:00 PM, three household members with one television set and a head of household having some college credit or bachelor's degree.

Within these forty-five (45) qualifying households, the tuning minutes aggregator 222 may identify two-hundred (200) household tuning minutes total, but only one hundred and two (102) of those minutes were associated with the males 45-54. The example imputation engine 224 of the illustrated example calculates a probability for imputation as the ratio of exposure minutes for the males 45-54 and the total household tuning minutes for all qualifying households in a manner consistent with example Equation (4).

$$\text{Probability of Imputation} = \frac{\text{Exposure Minutes by Persons of Interest}}{\text{Tuning Minutes of Qualifying Households}} \qquad \text{Equation (4)}$$

In the illustrated example of Equation (4), the probability of imputation using the examples disclosed above is 0.51 (i.e., 102 exposure minutes divided by 200 tuning minutes, in this example). In some examples, the probability value calculated by the example cell probability engine 216 is retained and/or otherwise imputed to MMH households 108 based on a normal distribution, such as a comparison of the calculated probability value to a random or pseudo-random number. In the event the calculated probability value is greater than the random number, then the household member having the categorical combination of interest is credited as viewing a tuning segment. In other words, the household tuning data is imputed to the MMH household 108 as exposure data for the categorical combination of interest. On the other hand, in the event the calculated probability value is less than the random or pseudo-random number, then the household member having the categorical combination of interest is not credited as viewing the tuning segment. In other words, the household tuning data is not imputed to the MMH household 108.

As discussed above, when the combinations of all categories of interest are represented by a number of households less than a threshold value within the donor pool, the cell probability calculation approach may not exhibit a level of confidence deemed suitable for statistical research. Generally speaking, a number of households in a research geography of interest matching a single one of the categories of interest may be relatively high. However, as additional categories of interest are added, the number of households having an inclusive match for all such categories decreases. In some circumstances, the number of matching households available in the donor pool after performing a logical "AND" of all categories of interest eventually results in a donor pool having a population lower than a threshold value, which may not exhibit statistical confidence when applying the cell probability technique described above. In such examples, the probability engine 212 prevents a traditional cell probability technique from being employed to calculate a probability of whether a household of interest should be credited with exposure behavior for the categorical combination of interest (e.g., whether the male age 45-54 of the household should be credited with captured exposure (tuning) behavior of the household). Instead, the example probability engine 212 invokes the example independent distribution engine 218 when the number of households having the desired combination of categories of interest is below a threshold value. As described in further detail below, instead of using a pool of households that match all categories of interest, households are employed that match some of the categories of interest are used when calculating a probability of viewing.

In operation, the example category qualifier 226 of FIG. 2 identifies all households within the donor pool (e.g., within the LPM collection geography, such as the Charlotte DMA) that have the same set of key predictors (i.e., particular categories within the set of categories of interest). In some examples, key predictors reflect a set of categories that exhibit a relatively greater degree of success than other combinations of categories. For instance, a first set of key predictors may include a first set of categories related to a geography of interest, such as sunscreen products in geographic vicinity to ocean vacation areas, or skiing products in geographic vicinity to mountain ranges. While examples disclosed herein refer to a Local People Meter (LPM), such examples are not limited thereto. In some examples, a National People Meter (NPM) may be employed as a collection geography that reflects a relatively larger area, such as a nation. In particular, a subset of the example eight (8) original categories of interest may include (1) households matching a household size category, (2) households matching a same member gender category, and (3) households matching a same member age category. In other words, while the original eight example categories of interest included the aforementioned three categories, the remaining categories are removed from consideration when identifying households from the available data pool. For example, the remaining categories are removed that are related to (4) households matching a same tuned station category, (5) households matching a same education category, (6) households matching a same number of television sets category, (7) households matching a same daypart category, and (8) households matching a same life stage/household size category.

Because, in the illustrated example, the donor pool is constructed with only MMPM households 106, the example category qualifier 226 retrieves and/or otherwise obtains a total household tuning minutes value and a total exposure minutes value for the available households meeting the size/gender/age criteria of interest (e.g., dimensions (1), (2) and (3) from above). For example, if the size/gender/age criteria of interest is for a household size of two or more people having a male age 45-54, then the example category qualifier 226 identifies a number of households from that size/gender/age subset.

Figure 5:
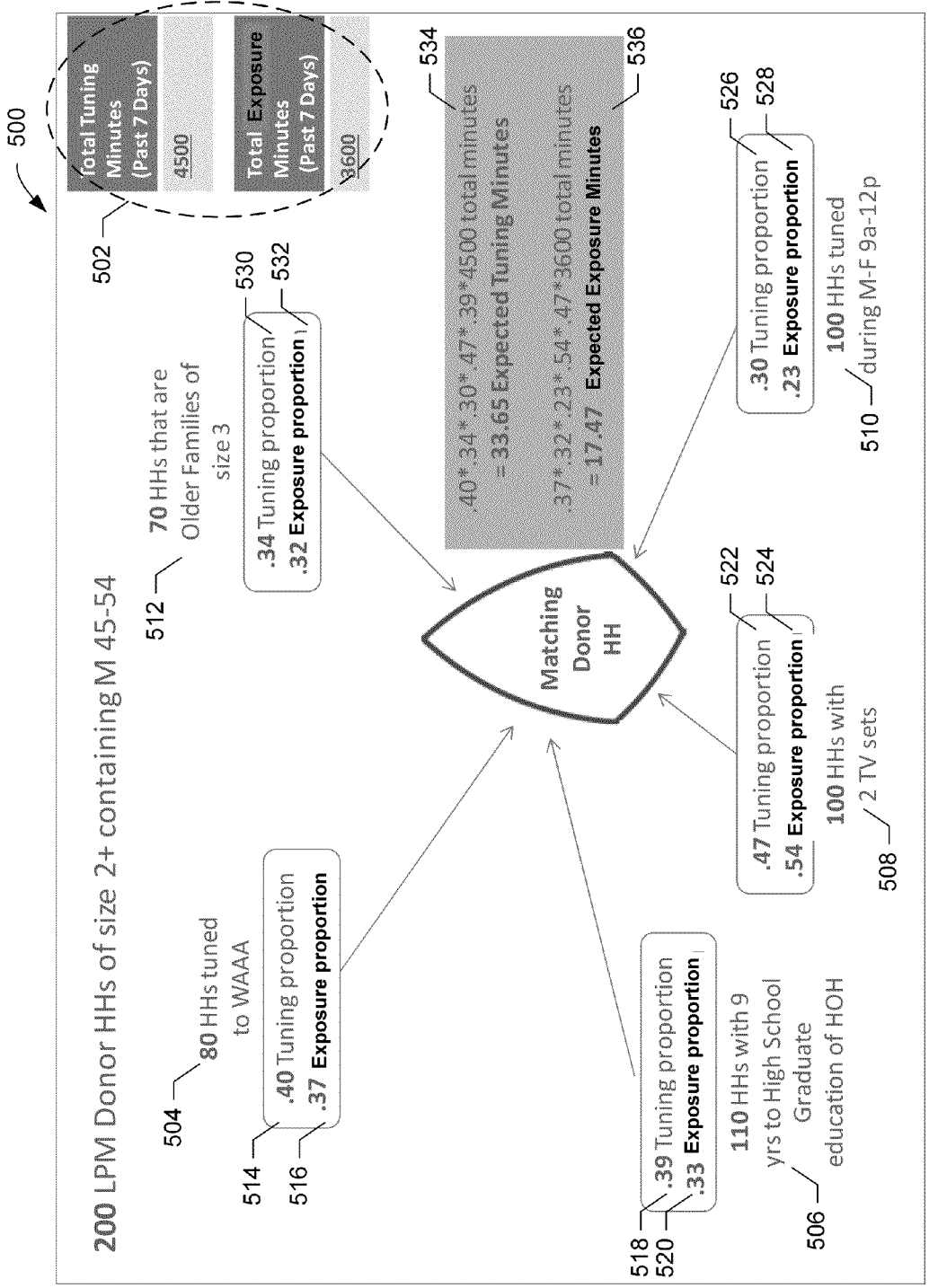
FIG. 5 is an example dimension subset map to illustrate independent distribution of household dimensions used to characterize households with media meter data.

FIG. 5 illustrates an example category subset map 500 created by the independent distribution engine 226 of the example of FIG. 2. The example independent distribution engine assembles household tuning minutes and exposure minutes from subsets of the categories of interest. In the illustrated example of FIG. 5, the map 500 includes a total household tuning minutes count and a total exposure minutes count associated with the key predictor categories 502 of size/age/gender. In this example, the category qualifier 226 identified a total of two-hundred (200) households matching the size/gender/age criteria. The two-hundred households include a total of 4500 tuning minutes (i.e., minutes that identify a tuned station but do not identify a corresponding household member) and a total of 3600 exposure minutes (e.g., minutes for an identified station and also identified individuals who were present in the audience).

The example proportion manager 228 of FIG. 2 selects one or more remaining categories of interest that fall outside the key predictor categories to determine corresponding available matching households, household tuning minutes and exposure minutes. The example remaining categories may be referred to as secondary predictors or secondary categories that affect the probability of media exposure. While example key predictor categories disclosed herein include household size, gender and age, example methods, apparatus, systems and/or articles of manufacture may include any other, additional and/or alternate type(s) of categories for the key predictors. Additionally, while example secondary categories disclosed herein include tuned station, education, number of media presentation devices (e.g., TV sets), daypart and life-stage, example methods, apparatus, systems and/or articles of manufacture may additionally and/or alternatively include any other type of categories as the secondary categories.

For example, the proportion manager 228 of the illustrated example selects one or more secondary categories to determine a corresponding number of matching households, household tuning minutes and exposure minutes. Again, and as described above, the temporal units of "minutes" are employed herein as a convenience when discussing example methods, apparatus, systems and/or articles of manufacture disclosed herein, such that one or more additional and/or alternative temporal units (e.g., seconds, days, hours, weeks, etc.) may be considered, without limitation. In the illustrated example of FIG. 5, a tuned station category 504 (e.g., one of the secondary categories of interest) is identified by the proportion manager 228 to have eighty (80) households, which match the desired station of interest (e.g., station "WAAA"), in which those households collected 1800 household tuning minutes and 1320 exposure minutes. Additionally, the example proportion manager 228 of FIG. 2 selects an education category 506 (e.g., one of the secondary categories of interest) and determines that one-hundred and ten (110) households match the desired education level of interest (e.g., households in which the head of household has 9 years of school to high school graduation), in which those households collected 1755 household tuning minutes and 1200 exposure minutes. Further, the example proportion manager 228 of FIG. 2 selects a number of television sets category 508 (e.g., one of the secondary categories of interest) and determines that one-hundred (100) households match the desired number of TV sets within a household value, in which those households collected 2100 household tuning minutes and 1950 exposure minutes. Other example categories considered by the example proportion manager 228 of FIG. 2 include a daypart category 510 (e.g., one of the secondary categories of interest), in which the proportion manager 228 of FIG. 2 determines that one-hundred (100) households match the desired daypart category, in which those households collected 1365 household tuning minutes and 825 exposure minutes. The example proportion manager 228 of FIG. 2 also selects a life stage/household size category 512 (e.g., one of the secondary categories of interest) and determines that seventy (70) households match the desired type of life stage/household size value, in which those households collected 1530 household tuning minutes and 1140 exposure minutes.

Generally speaking, the proportion manager 228 of the illustrated example identifies secondary category contributions of household tuning minutes and exposure minutes independently from the household tuning and exposure minutes that may occur for only such households that match all of the desired target combination of categories of interest. After each individual secondary category contribution household tuning minute value and exposure minute value is identified, the example distribution engine 230 calculates a corresponding household tuning proportion and exposure proportion that is based on the key predictor household tuning and exposure minute values. As described in further detail below, the example distribution engine 230 calculates a household tuning proportion and an exposure proportion associated with each of the secondary categories of interest (e.g., the tuned station category 504, the education category 506, the number of sets category 508, the daypart category 510 and the life stage/size category 512). In other words, examples disclosed herein capture, calculate and/or otherwise identify contributory effects of one or more secondary categories of interest by calculating and/or otherwise identifying a separate corresponding tuning proportion and separate corresponding exposure proportion for each one of the secondary categories. As described in further detail below, separate contributory effects of the one or more secondary categories are aggregated to calculate expected tuning minutes and expected exposure minutes.

In the illustrated example of FIG. 5, the distribution engine 230 divides the household tuning minutes associated with the tuned station category 504 (e.g., 1800 household tuning minutes) by the total household tuning minutes associated with the key predictor categories 502 (e.g., 4500 household tuning minutes) to calculate a corresponding tuned station category tuning proportion 514. Additionally, the distribution engine 230 of the illustrated example divides the exposure minutes associated with the tuned station category 504 (e.g., 1320 exposure minutes) by the total exposure minutes associated with the key predictor categories 502 (e.g., 3600 household viewing minutes) to calculate a corresponding tuned station category viewing proportion 516. For the sake of example, the calculated tuned station category tuning proportion 514 is 0.40 (e.g., 1800 household tuning minutes divided by 4500 total exposure minutes) and the calculated tuned station category viewing proportion 516 is 0.37 (e.g., 1320 exposure minutes divided by 3600 total exposure minutes).

The example distribution engine 230 of FIG. 2 also calculates a household tuning proportion and exposure proportion in connection with the example education category 506. In the illustrated example of FIG. 5, the distribution engine 230 divides the household tuning minutes associated with the education category 504 (e.g., 1755 household tuning minutes) by the total household tuning minutes associated with the key predictor categories 502 (e.g., 4500 household tuning minutes) to calculate a corresponding education category household tuning proportion 518. Additionally, the example distribution engine 230 of the illustrated example divides the exposure minutes associated with the education category 506 (e.g., 1200 exposure minutes) by the total exposure minutes associated with the key predictor categories 502 (e.g., 3600 exposure minutes) to calculate a corresponding education category exposure proportion 520. For the sake of example, the calculated education category household tuning proportion 518 is 0.39 (e.g., 1755 household tuning minutes divided by 4500 total household tuning minutes) and the calculated education category exposure proportion 520 is 0.33 (e.g., 1200 exposure minutes divided by 3600 total exposure minutes).

The example distribution engine 230 of FIG. 2 also calculates a household tuning proportion and exposure proportion in connection with the example household sets category 508. In the illustrated example of FIG. 5, the distribution engine 230 divides the household tuning minutes associated with the household sets category 508 (e.g. 2100 household tuning minutes) by the total household tuning minutes associated with the key predictor categories 502 (e.g., 4500 household tuning minutes) to calculate a corresponding household sets category household tuning proportion 522. Additionally, the example distribution engine 230 of the illustrated example divides the exposure minutes associated with the household sets category 508 (e.g., 1950 exposure minutes) by the total exposure minutes associated with the key predictor categories 502 (e.g., 3600 exposure minutes) to calculate a corresponding household sets category exposure proportion 524. For the sake of example, the calculated household sets category household tuning proportion 522 is 0.47 (e.g., 2100 household tuning minutes divided by 4500 total household tuning minutes) and the calculated household sets category exposure proportion 524 is 0.54 (e.g., 1950 exposure minutes divided by 3600 total exposure minutes).

The example distribution engine 230 of FIG. 2 also calculates a household tuning proportion and exposure proportion in connection with the example daypart category 510. In the illustrated example of FIG. 5, the distribution engine 230 divides the household tuning minutes associated with the daypart category 510 (e.g., 1365 household tuning minutes) by the total household tuning minutes associated with the key predictor categories 502 (e.g., 4500 household tuning minutes) to calculate a corresponding daypart category household tuning proportion 526. Additionally, the example distribution engine 230 of FIG. 2 divides the exposure minutes associated with the daypart category 510 (e.g., 825 exposure minutes) by the total exposure minutes associated with the key predictor categories 502 (e.g., 3600 exposure minutes) to calculate a corresponding daypart category exposure proportion 528. For the sake of example, the calculated daypart category household tuning proportion 526 is 0.30 (e.g., 1365 household tuning minutes divided by 4500 total household tuning minutes) and the calculated daypart category exposure proportion 528 is 0.23 (e.g., 825 exposure minutes divided by 3600 total exposure minutes).

The example distribution engine 230 of FIG. 2 also calculates a household tuning proportion and exposure proportion in connection with the example life stage/size category 512. In the illustrated example of FIG. 5, the distribution engine 230 divides the household tuning minutes associated with the life stage/size category 512 (e.g. 1530 household tuning minutes) by the total household tuning minutes associated with the key predictor categories 502 (e.g., 4500 household tuning minutes) to calculate a corresponding life stage/size category household tuning proportion 530. Additionally, the example distribution engine 230 of FIG. 2 divides the exposure minutes associated with the life stage/size category 512 (e.g., 1140 exposure minutes) by the total exposure minutes associated with the key predictor categories 502 (e.g., 3600 exposure minutes) to calculate a corresponding life stage/size category exposure proportion 532. In this example, the calculated life stage/size category tuning proportion 530 is 0.34 (e.g., 1530 household tuning minutes divided by 4500 total household tuning minutes) and the calculated life stage/size category exposure proportion 532 is 0.32 (e.g., 1140 exposure minutes divided by 3600 total exposure minutes).

As described above, each of the target combinations of categories of interest has an independently calculated household tuning proportion value and an independently calculated exposure proportion value. The example distribution engine 230 of FIG. 2 calculates the product of all household tuning proportion values (e.g., the tuned station category household tuning proportion 514, the education category household tuning proportion 518, the household sets category household tuning proportion 522, the daypart category household tuning proportion 526, and the life stage/size category household tuning proportion 530) to determine total expected household tuning minutes 534. Additionally, the example distribution engine 230 of FIG. 2 calculates the product of all household exposure proportion values (e.g., the tuned station category exposure proportion 516, the education category exposure proportion 520, the household sets category exposure proportion 524, the daypart category exposure proportion 528, and the life stage/size category exposure proportion 532) to determine total expected exposure minutes 536. A final independent distribution is calculated by the example distribution engine 230 in a manner consistent with example Equation (5), and reflects a panelist behavior probability associated with the target combination of categories of interest.

$$\text{Independent Distribution Probability} = \frac{\text{Expected Exposure Minutes}}{\text{Expected Household Tuning Minutes}} \quad \text{Equation (5)}$$

In the example exposure and household tuning minutes discussed above, the resulting independent distribution probability is 0.52. In effect, the resulting independent distribution probability is interpreted as a male 45-54 who lives in a three (3) person household, classified as an older family, with a head of house education of nine (9) years to high school graduate, with two (2) television sets in the household, has a 52% likelihood of watching station WAAA during the daypart of Monday through Friday from 9:00 AM to 12:00 PM.

Figure 10:
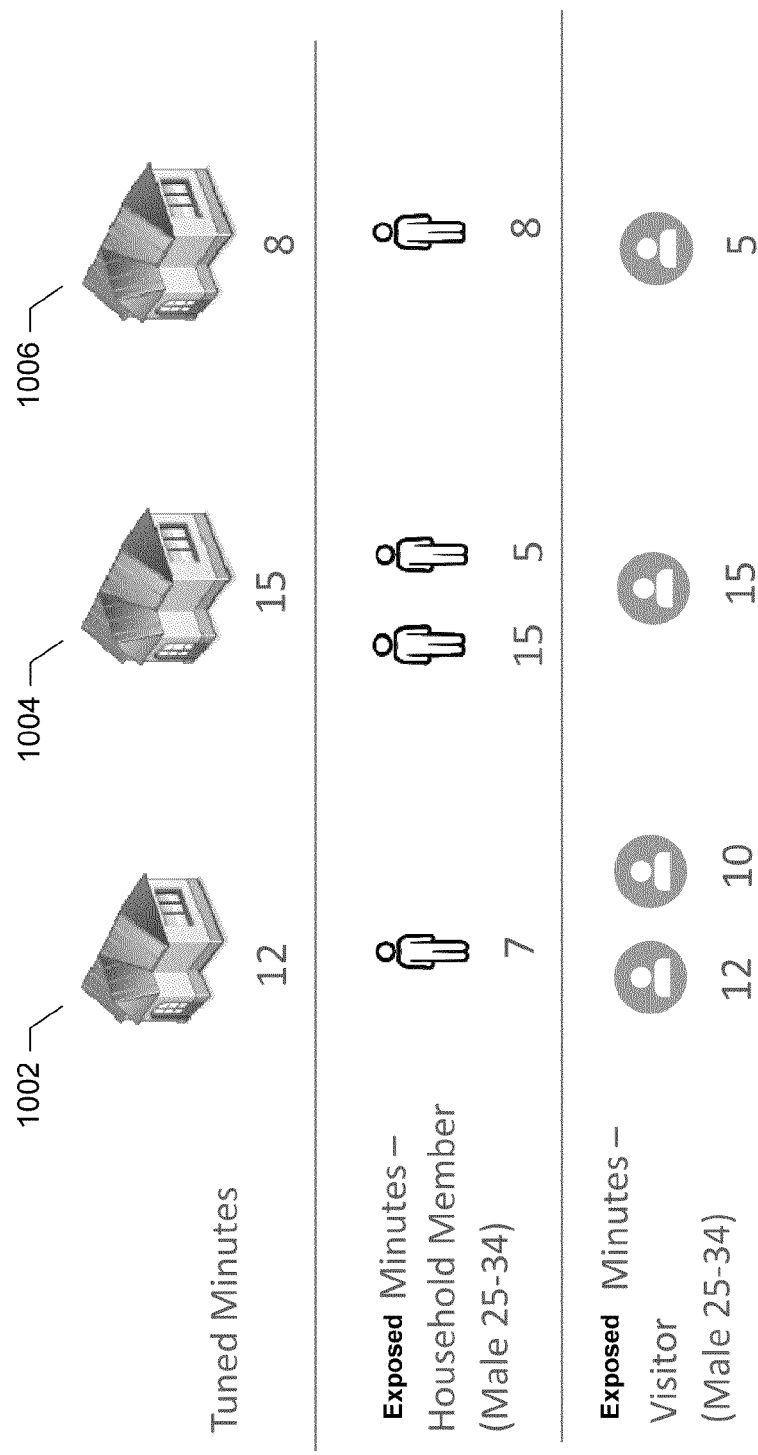
FIG. 10 is an example visitor table to illustrate example visitor tuning minutes and exposure minutes for a demographic of interest.
Figure 15:
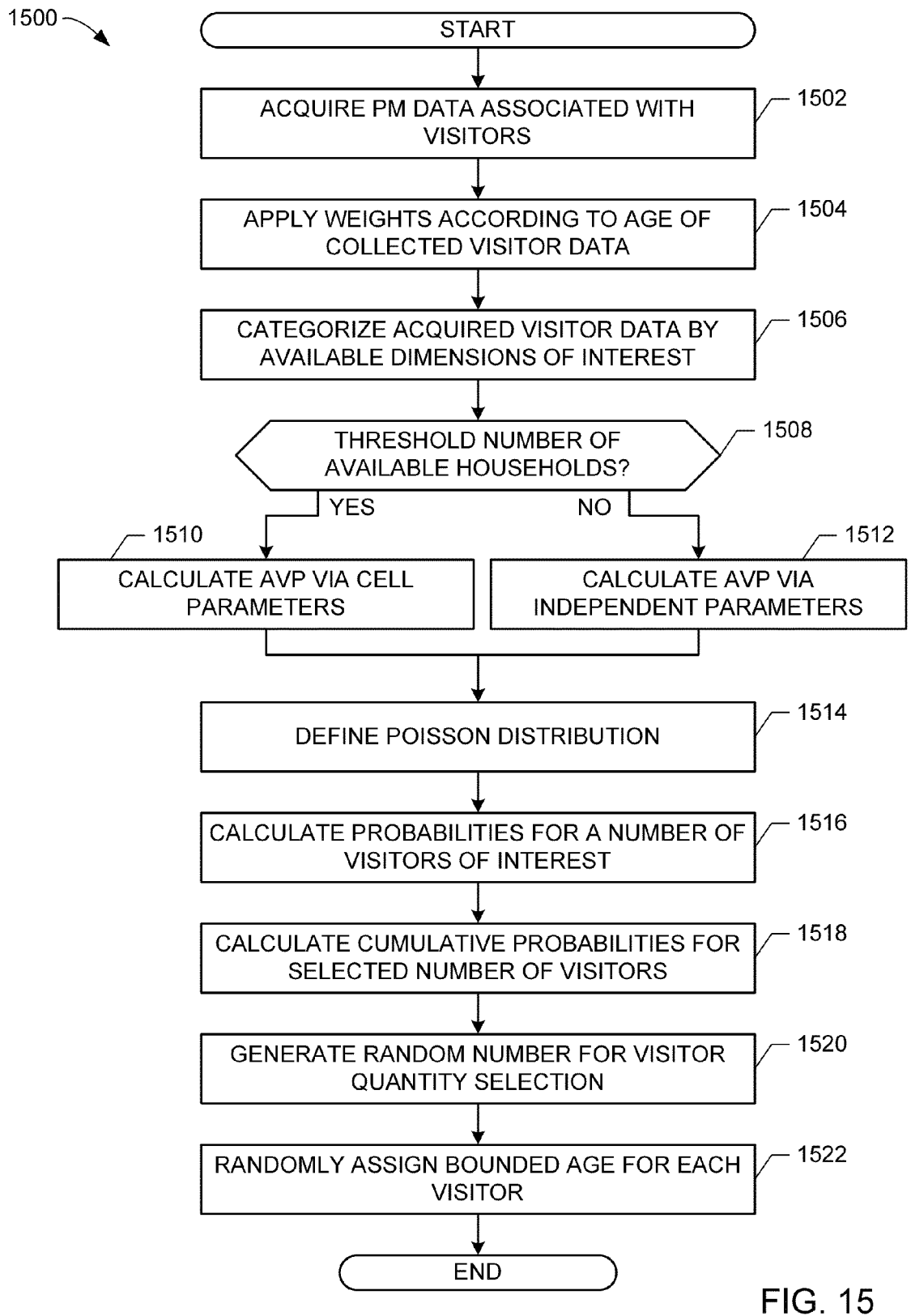
FIG. 15 is a flowchart representative of example machine readable instructions that may be executed to implement the example visitor imputation engine of FIGS. 1 and 11.

While an example manner of implementing the imputation engine 110 of FIG. 1 is illustrated in FIGS. 2-5, one or more of the elements, processes and/or devices illustrated in FIG. 2 may be combined, divided, re-arranged, omitted, eliminated and/or implemented in any other way. Additionally, while an example manner of implementing the visitor imputation engine 112 of FIGS. 1, 2 and 11, and described in further detail below, one or more of the elements, processes and/or devices illustrated in FIG. 11 may be combined, divided, rearranged, omitted, eliminated and/or implemented in any other way. Additionally, while an example manner of implementing the ambient tuning engine 120 and the example on/off detection engine 130 of FIG. 1 is illustrated in FIGS. 10 and 15, respectively, and as described in further detail below, one or more of the elements, processes and/or devices illustrated in FIGS. 10 and 15 may be combined, divided, rearranged, omitted, eliminated and/or implemented in any other way. Further, the example people meter interface 202, the example categorizer 206, the example weighting engine 210, the example media meter interface 204, the example probability engine 212, the example category manager 214, the example cell probability engine 216, the example category fit manager 220, the example minutes aggregator 222, the example imputation engine 224, the example independent distribution engine 218, the example category qualifier 226, the example proportion manager 228, the example distribution engine 230 and/or, more generally, the example imputation engine 110 and/or the example visitor imputation engine 112 of FIG. 1 may be implemented by hardware, software, firmware and/or any combination of hardware, software and/or firmware. Additionally, an example average visitor parameter (AVP) calculator 1102, an example distribution engine 1104, an example random number generator 1106, an example visitor assignor 1108, an example simultaneous tuning monitor 1602, an example crediting manager 1604, an example station comparator 1606, an example tuning type assignor 1608, an example automatic gain control monitor 1610, an example code presence manager 1612, an example modeling engine 1614, an example code stacking manager 1616 and/or, more generally, the example ambient tuning engine 120 of FIGS. 1 and 16 may be implemented by hardware, software, firmware and/or any combination of hardware, software and/or firmware. Thus, for example, any of the example people meter interface 202, the example categorizer 206, the example weighting engine 210, the example media meter interface 204, the example probability engine 212, the example category manager 214, the example cell probability engine 216, the example category fit manager 220, the example minutes aggregator 222, the example imputation engine 224, the example independent distribution engine 218, the example category qualifier 226, the example proportion manager 228, the example distribution engine 230, the example average visitor parameter (AVP) calculator 1102, an example distribution engine 1104, an example random number generator 1106, an example visitor assignor 1108, the example simultaneous tuning monitor 1602, the example crediting manager 1604, the example station comparator 1606, the example tuning type assignor 1608, the example automatic gain control monitor 1610, the example code presence manager 1612, the example modeling engine 1614, the example code stacking manager 1616 and/or, more generally, the example imputation engine 110, the example visitor imputation engine 112, the example ambient tuning engine 120, and/or the example on/off detection engine 130 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)).

When reading any of the apparatus or system claims of this patent to cover a purely software and/or firmware implementation, at least one of the example people meter interface 202, the example categorizer 206, the example weighting engine 210, the example media meter interface 204, the example probability engine 212, the example category manager 214, the example cell probability engine 216, the example category fit manager 220, the example minutes aggregator 222, the example imputation engine 224, the example independent distribution engine 218, the example category qualifier 226, the example proportion manager 228, the example distribution engine 230, the example average visitor parameter (AVP) calculator 1102, an example distribution engine 1104, an example random number generator 1106, an example visitor assignor 1108, the example simultaneous tuning monitor 1602, the example crediting manager 1604, the example station comparator 1606, the example tuning type assignor 1608, the example automatic gain control monitor 1610, the example code presence manager 1612, the example modeling engine 1614, the example code stacking manager 1616 and/or, more generally, the example imputation engine 110, the example visitor imputation engine 112, the example ambient tuning engine 120, and/or the example on/off detection engine 130 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example imputation engine 110, the example visitor imputation engine 112, the example ambient tuning engine 120, and/or the example on/off detection engine 130 of FIGS. 1, 2, 11, 16 and/or 21 may include one or more elements, processes and/or devices in addition to, or instead of, those illustrated in FIGS. 2, 11, 16 and/or 21 and/or may include more than one of any or all of the illustrated elements, processes and devices.

Flowcharts representative of example machine readable instructions for implementing the imputation engine 110, the visitor imputation engine 112, the ambient tuning engine 120 and the on/off detection engine 130 of FIGS. 1, 2, 11, 16 and 21 are shown in FIGS. 6-9, 15, 17-19 and 22. In these examples, the machine readable instructions comprise program(s) for execution by a processor such as the processor 2312 shown in the example processor platform 2300 discussed below in connection with FIG. 23. The program(s) may be embodied in software stored on a tangible computer readable storage medium such as a CD-ROM, a floppy disk, a hard drive, a digital versatile disk (DVD), a Blu-ray disk, or a memory associated with the processor 2312, but the entire program(s) and/or parts thereof could alternatively be executed by a device other than the processor 2312 and/or embodied in firmware or dedicated hardware. Further, although the example program(s) is/are described with reference to the flowcharts illustrated in FIGS. 6-9, 15, 17-19 and 22, many other methods of implementing the example imputation engine 110, the example visitor imputation engine 112, the example ambient tuning engine 120 and/or the example on/off detection engine 130 may alternatively be used. For example, the order of execution of the blocks may be changed, and/or some of the blocks described may be changed, eliminated, or combined.

As mentioned above, the example processes of FIGS. 6-9, 15, 17-19 and 22 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 6-9, 15, 17-19 and 22 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 6:
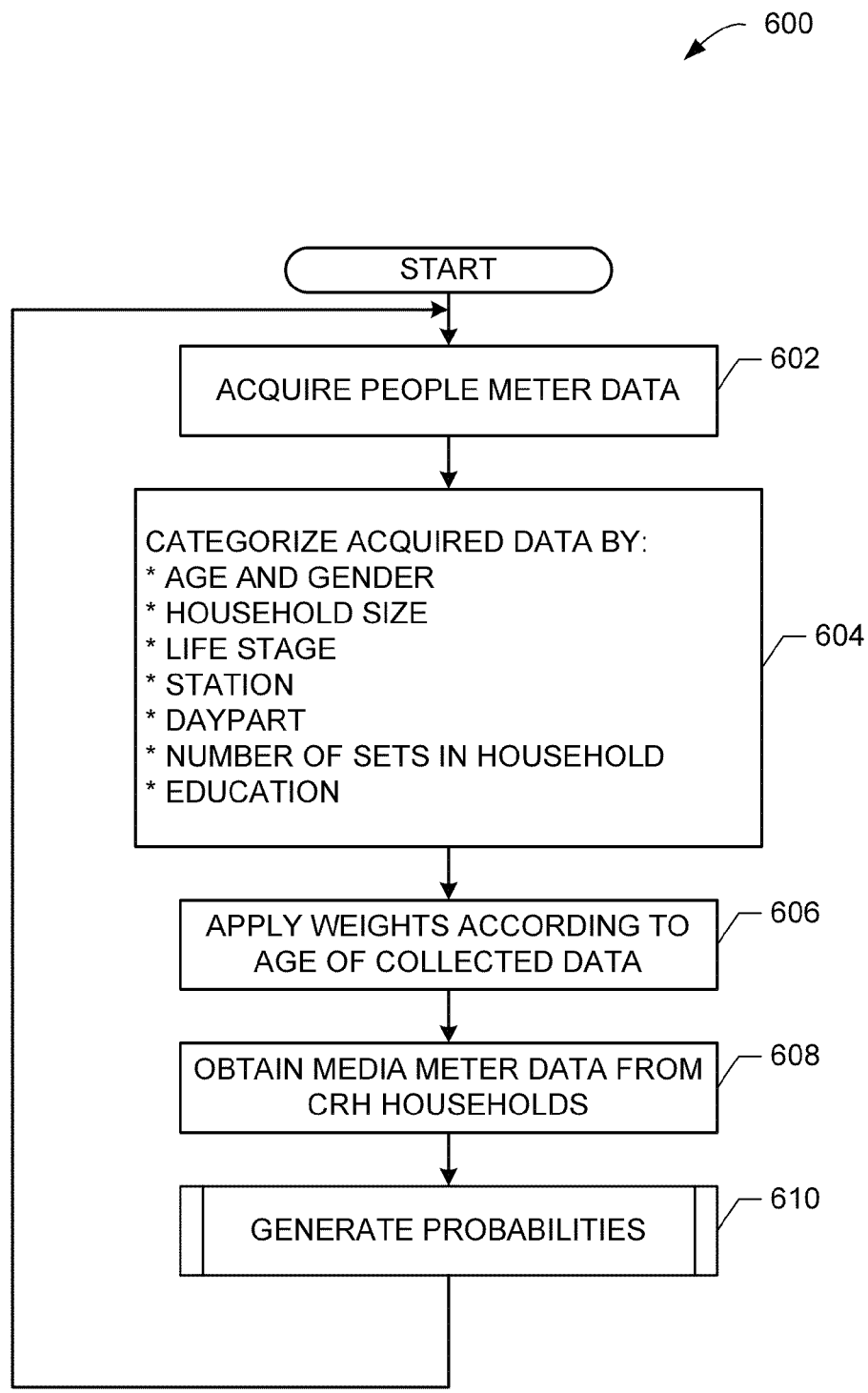
FIGS. 6-9 are flowcharts representative of example machine readable instructions that may be executed to implement the example imputation engine of FIGS. 1 and 2.

The program 600 of FIG. 6 begins at block 602 where the example people meter interface 202 acquires PM data associated with household members from the PM devices located in the example MMPM households 106 that have both MM devices and PM devices. As described above, the PM devices have input(s) (e.g., buttons for each household member and a visitor button to identify their respective presence in the audience currently exposed to media). The example PM interface 202 identifies collected data that is within a threshold period of time from a current day in an effort to weight such data according to its relative age. As described above in connection with example Equation (1), an accuracy of the viewing index is better when the corresponding collected data is more recent. The example categorizer 206 categorizes the acquired PM data based on one or more categories of interest (block 604). In some examples, the categorizer 206 categorizes and/or otherwise identifies particular households associated with one or more categories, such as an age/gender combination of interest, a particular household size of interest, a particular life stage of interest, a particular viewed station/affiliate/genre of interest, a particular daypart of interest, a number of television sets of interest within the household (e.g., households with one television set, households with 2-3 television sets, households with three or more television sets, etc.), and/or an education level of the head of household. While a relatively large number of MMPM households 106 will have at least one of the aforementioned categories, a substantially smaller number of MMPM households 106 will represent all of the target combination of categories of interest to a market researching during a market study.

As described above in connection with FIG. 4, the example weighting engine 210 applies weights in proportions that are based on a number of days since the date of collection of the donor data (block 606). The example media meter interface 204 also acquires household tuning data from media meters in the MMH households 108 (block 608). Depending on whether a threshold number of households exist in the donor pool (e.g., the donor pool of MMPM households in the region of interest 104) that match all of the categories of interest, the example probability engine 212 will invoke a corresponding probability calculation technique (block 610) as described in further detail below in connection with FIG. 7.

Figure 7:
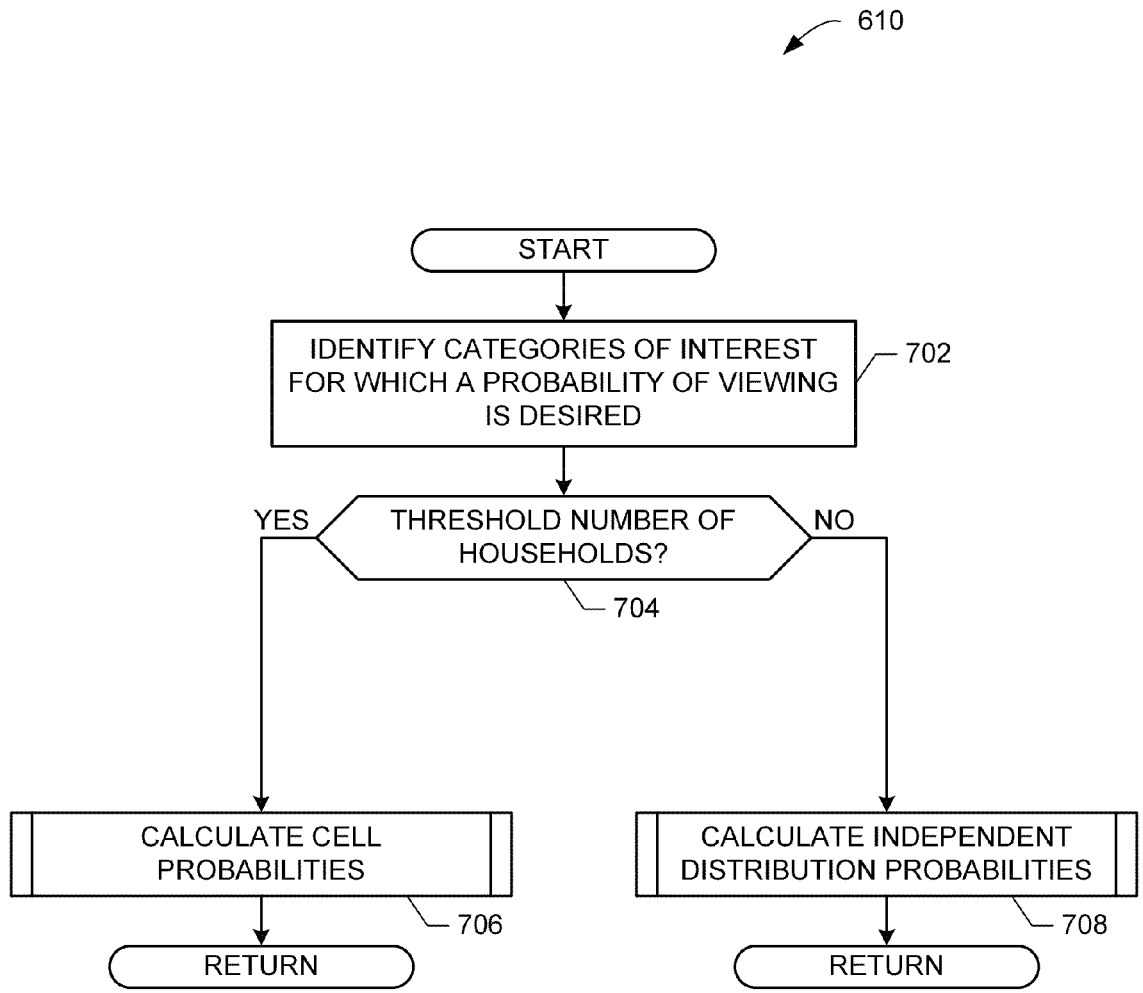

FIG. 7 includes additional detail from the illustrated example of FIG. 6. When generating probabilities, the example category manager identifies categories of interest to use. Generally speaking, example methods, apparatus, systems and/or articles of manufacture disclosed herein generate probabilities based on a target combination of categories of interest such as, for example, determining the likelihood of viewing for (1) a male age 45-54 (2) who lives in a three-person household, (3) classified as an older family (4) with the head of the household having an education of nine (9) years of school to high-school graduate, (5) with two television sets in the household and (6) is watching station WAAA (7) between the daypart of 9:00 AM to 12:00 PM. The example category manager 214 identifies categories of interest for which a probability of viewing (exposure) is desired (block 702), such as the example seven categories referred-to above. Based on the identified target combination of categories of interest, such as the example above having the male age 45-54 et al., the example category manager 214 determines whether the available pool of data, previously weighted by the example weighting engine 210, includes a threshold number of households that match all (e.g., all seven) of the target combination of categories of interest (block 704).

Assuming, for the sake of example, the threshold number of households to match all of the categories of interest is thirty (30), and the pool of data includes that threshold amount of available households (block 704), the example cell probability engine 216 is invoked by the probability engine 212 to calculate a probability value via a cell probability technique (block 706). On the other hand, if the pool of data does not satisfy the threshold amount of thirty households (e.g., has less than 30 households) (block 704), then the example probability engine 212 invokes the example independent distribution engine 218 to calculate a probability value via an independent distribution technique (block 708).

Figure 8:
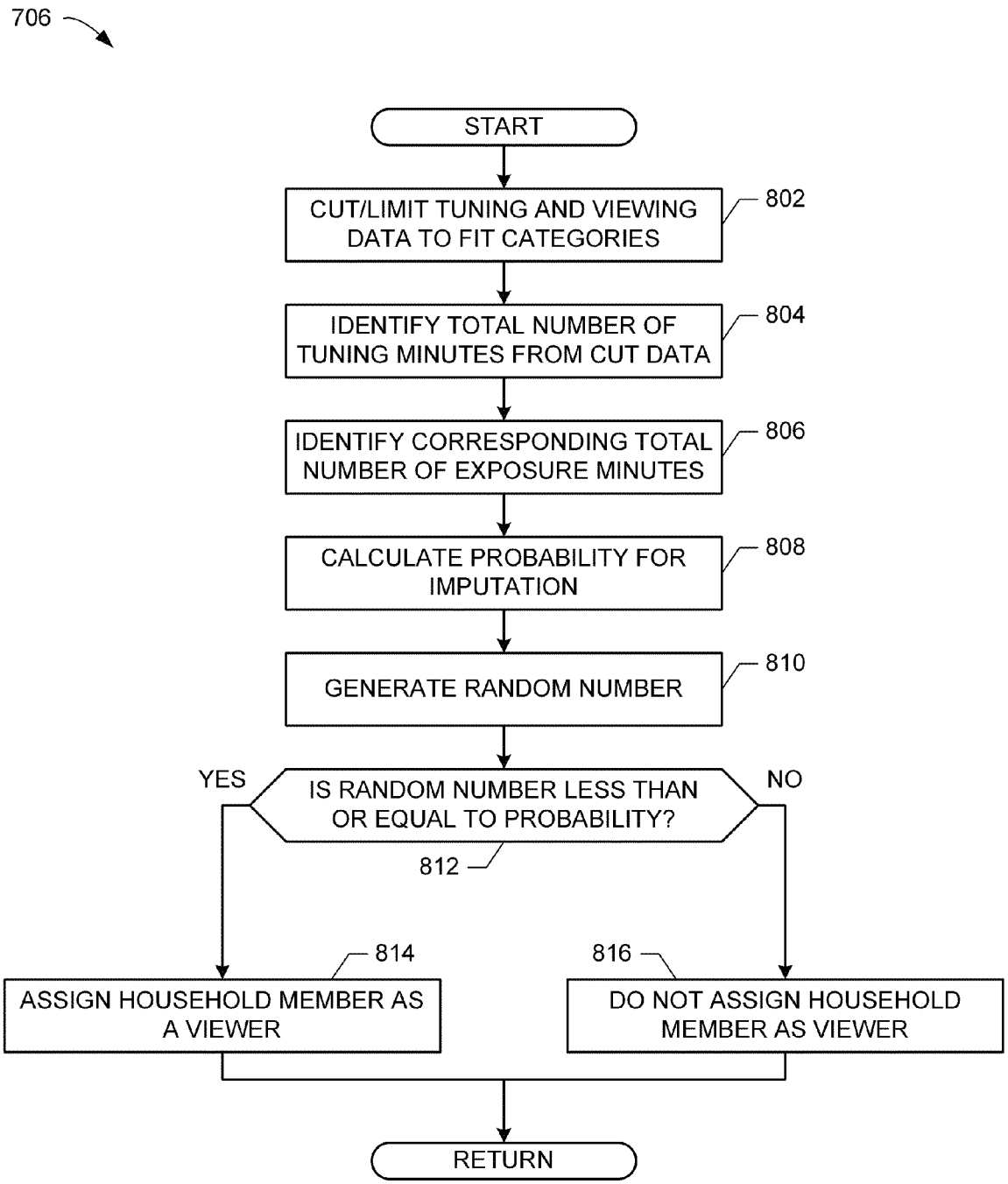

FIG. 8 illustrates an example manner of implementing the cell probability calculation (block 706) of FIG. 7. In the illustrated example of FIG. 8, the category fit manager 220 culls and/or otherwise limits tuning and viewing data to fit previously established categories (block 802). As described above, in the event a market researcher has an interest for a male age 50, industry standard panelist data acquisition techniques may not exactly fit the desired demographic category. Instead, the industry standard available data may be categorized in terms of males between an age range of 45-54. Because the desired category of interest is for a male age 50, the example category fit manager 220 identifies the closest relevant category grouping that will satisfy the market researcher, which in this example, includes the group of men between the ages of 45-54. The example minutes aggregator 222 identifies a total number of household tuning minutes from the selected category (block 804) and identifies a total number of exposure minutes from the selected category (block 806). In other words, of all the households that match the categories of men age 45-54, the total number of household tuning minutes and exposure minutes are identified.

The example imputation engine 224 of FIG. 2 calculates a probability for imputation based on the aforementioned totals (block 808). As described above, the probability of imputation may be calculated by the example imputation engine 224 in a manner consistent with example Equation (4). The example imputation engine 224 invokes a random number generator to generate a random or pseudo-random number (block 810) and, if the resulting random or pseudo-random number is less than or equal to the probability value (block 812), a household member within a household having a media meter 108 is assigned as a viewer of the tuning segment (block 814). On the other hand, in the event the resulting random or pseudo-random number is not less than or equal to the probability value, then the household member within the household having the media meter 108 is not assigned as a viewer of the tuning segment (block 816).

Returning to block 704 of FIG. 7, and continuing with the assumption that the threshold number of households to match all of the categories of interest is thirty (30), and the pool of data fails to include that threshold number of qualifying households (block 704), then the example independent distribution engine 218 is invoked by the probability engine 212 to calculate a probability value via an independent distribution technique (block 710).

Figure 9:
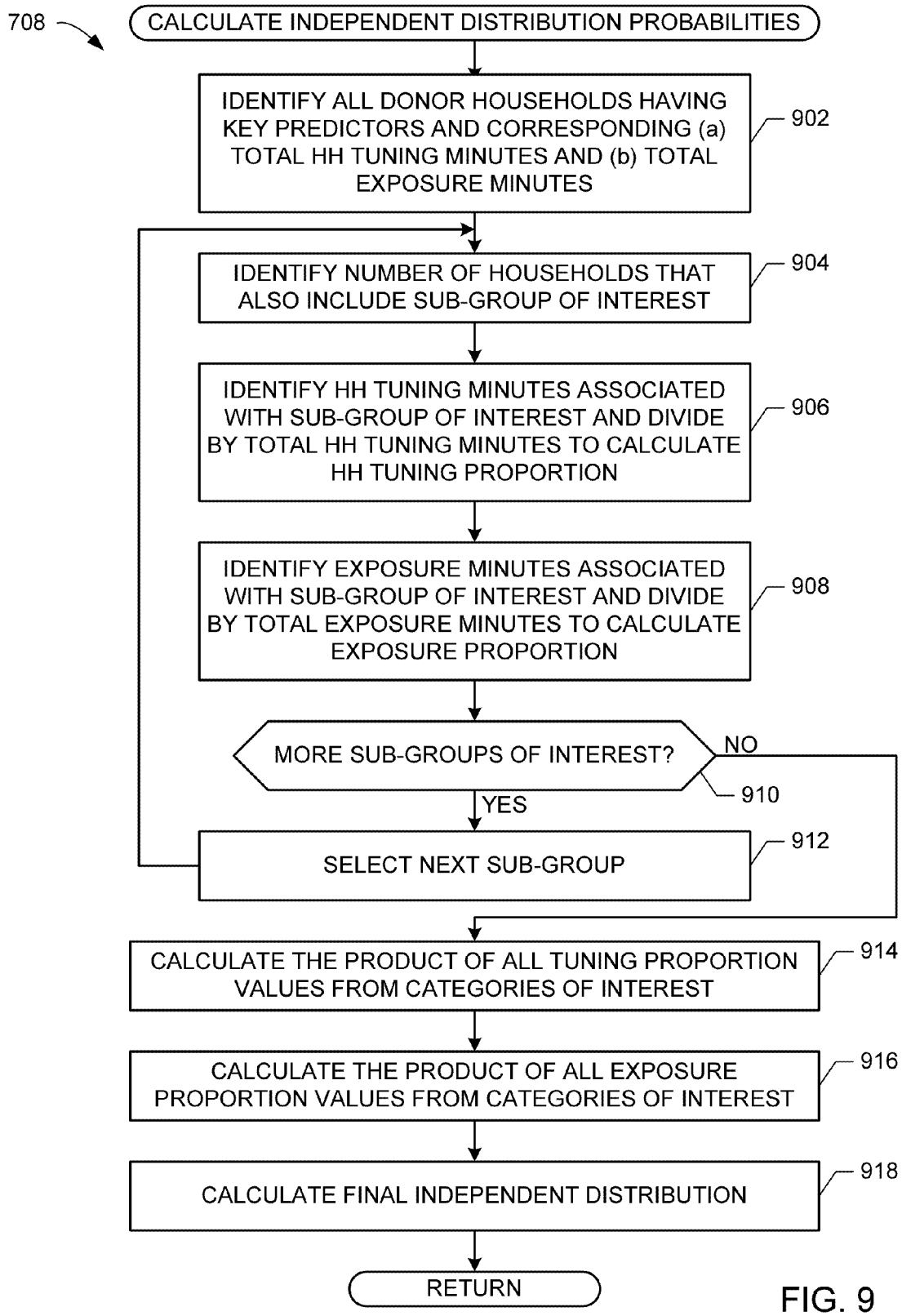

FIG. 9 illustrates an example implementation of the independent distribution probability calculation (block 708) of FIG. 7. In the illustrated example of FIG. 9, the category qualifier 226 identifies all panelist households (e.g., LPM, NPM, etc.) within the donor pool that have the same set of key predictors (block 902). Additionally, the example category qualifier 226 identifies a corresponding number of total tuning minutes associated with the key predictors, and a corresponding number of total household exposure minutes associated with the key predictors. As described above, key predictors may refer to a particular combination of a household size, a gender of interest within the household, and/or an age of interest within the household. For example, the category qualifier 226 may identify all households within the donor pool that have two or more household members, in which one of them is a male age 45-54. For illustration purposes, assume the example category qualifier identified two-hundred (200) households that have two or more members therein, in which one of them is a male age 45-54. Also assume that the combined number of identified households (200) reflect 4500 total household tuning minutes and 3600 total exposure minutes.

In addition to key predictors having an influence on the probability of viewing, one or more additional secondary predictors may also influence the probability of viewing. As described above, the market researcher may have a combined set or target combination of categories of interest, but a number of households having all of those combined set of categories of interest does not exceed a threshold value (e.g., thirty (30) households). However, while the combined set of categories of interest may not be represented en masse from the donor pool, sub portions of the combined set or target combination of categories may include a relatively large representation within the donor pool. Example methods, apparatus, systems and/or articles of manufacture disclosed herein identify independent sub portions (subgroups) of the combined set of categories of interest and corresponding households associated with each subgroup of interest, which are applied independently to calculate a household exposure probability.

The example proportion manager 228 identifies a number of households from the key predictors group (e.g., 200 households having a size 2+ and a male age 45-54) that match a subgroup of interest (block 904). From the subgroup of interest, the example proportion manager 228 identifies a number of household tuning minutes and divides that value by the total household tuning minutes to calculate a household tuning proportion associated with the subgroup of interest (block 906). For example, if the subgroup of interest is all households tuned to the same station (e.g., WAAA) (e.g., the tuned station category) and such households reflect 1800 tuning minutes, then the example proportion manager 228 divides 1800 by the total household tuning minutes of 4500 to calculate a tuned station category household tuning proportion of 0.40 (block 906). The example proportion manager 228 also identifies a number of exposure minutes and divides that value by the total exposure minutes to calculate an exposure proportion associated with the subgroup of interest (e.g., the example tuned station category) (block 908). For example, if the subgroup of interest is all households tuned to the same station (e.g., WAAA) (e.g., the household tuned station dimension) and such households reflect 1320 exposure minutes, then the example proportion manager 228 divides 1320 by the total exposure minutes of 3600 to calculate a tuned station category exposure proportion of 0.37 (block 908). If more subgroups of interest from the donor pool are available (block 910), then the example proportion manager 228 selects the next subgroup of interest (block 912) and control returns to block 904.

After category household tuning proportion values and exposure proportion values have been calculated for each subgroup of interest, the example distribution engine 230 calculates the product of all household tuning proportion values and the total household tuning minutes (e.g., 4500 in this example) from the categories of interest (block 914), and calculates the product of all exposure proportion values and the total exposure minutes (e.g., 3600 in this example) from the categories of interest (block 916). A final independent distribution probability may then be calculated as the ratio of the exposure minutes and the household tuning minutes in a manner consistent with example Equation (5). For example, and as described above in connection with FIG. 5, the resulting ratio of expected exposure minutes (17.47) and expected household tuning minutes (33.65) may be a value of 0.52. This resulting ratio indicates a 52% likelihood that the panelist member is a male age 45-54 that lives in a three person household, classified as an older family, with the head of household education of 9 years to high school graduate, with two television sets in the household, and watching station WAAA on Mondays through Fridays between 9:00 AM to 12:00 PM.

Visitor Imputation

As disclosed above, persons imputation utilizes who is in the household and what the household viewed such that for a given tuning segment, one or more household members may be assigned and/or otherwise associated with exposure. However, panelist households may have visitors that are exposed to media within the household, in which the available visitor information is limited to an age and a gender. As described above, the example PM includes inputs (e.g., buttons) for each household member as well as button(s) for entering age and gender information for any visitors interacting with the media device (e.g., a television). Example methods, apparatus, systems and/or articles of manufacture disclosed herein apply a model to, in view of collected panelist household visitor information, determine a number and corresponding age/gender of visitors for households that do not employ a PM.

Visitor imputation disclosed herein exhibits some similarities to persons imputation, and aspects of FIGS. 1-9 will be referred to in the following disclosure, as necessary. For example, both the persons imputation disclosed above and the visitor imputation disclosed below utilize tuning and exposure information to assign tuning segments and calculate ratios of exposure to tuning minutes. However, the visitor imputation viewing/tuning ratio, being the ratio of total visitor exposure to total household-level tuning exposure, reflects an average count of visitor exposure and not a probability. FIG. 10 further illustrates a manner in which visitor information is processed as compared to household member exposure information.

In the illustrated example of FIG. 10, information for a first household 1002, a second household 1004 and a third household 1006 exhibit twelve, fifteen and eight minutes, respectively, of time tuned by a particular station of interest (as determined by each household with both MM devices and PM devices). While the illustrated example of FIG. 10 only includes three households, such example is for illustrative purposes only and any number of household may be considered. One member of the first household 1002 was exposed to seven minutes out of twelve total tuning minutes, which results in a probability of viewing of 7/12 (58.3%). In the second household 1004, a first member was exposed to the full fifteen minutes, while a second member was exposed to five minutes of the tuned duration, resulting in a probability of viewing of (15+5)/(15+15) (66.7%). In the third household 1006, a first member of that household was exposed to the full eight minutes, resulting in a probability of viewing of 8/8 (100%). An overall viewing probability for the example households is determined in a manner consistent with example Equation 6.

$$\text{Probability Viewed} = \frac{\sum HH \text{ Member Exposure Minutes}}{\sum HH \text{ Tuning Minutes (by Person)}}. \qquad \text{Equation 6}$$

In the illustrated example of Equation 6, HH refers to household, and applying the example data from FIG. 10 to Equation 6 is shown in example Equation 7.

$$= \frac{(7) + (15+5) + (8)}{(12) + (15+15) + (8)} = \frac{35}{50} = .70. \qquad \text{Equation 7}$$

In the illustrated example of Equation 7, the households of interest for the example demographic group of males age 25-34 have a viewing probability of 0.70. However, the following analysis of visitors in the same households of interest calculates an average visitor viewing ratio in a manner consistent with example Equation 8.

$$Ave. \text{ Visitor Viewing} = \frac{\sum \text{Visitor Exposure Minutes for Each Person}}{\sum \text{Household Tuning Minutes}}. \qquad \text{Equation 8}$$

Applying the example data from FIG. 10 to Equation 8 is shown in example Equation 9.

$$= \frac{(12+10) + (15) + (5)}{(12) + (15) + (8)} = \frac{42}{35} = 1.20. \qquad \text{Equation 9}$$

In the illustrated example of Equation 9, the households of interest for the visitors that are reporting male age 25-34 exhibit an average of 1.20 minutes of viewing time for each tuned minute.

Figure 11:
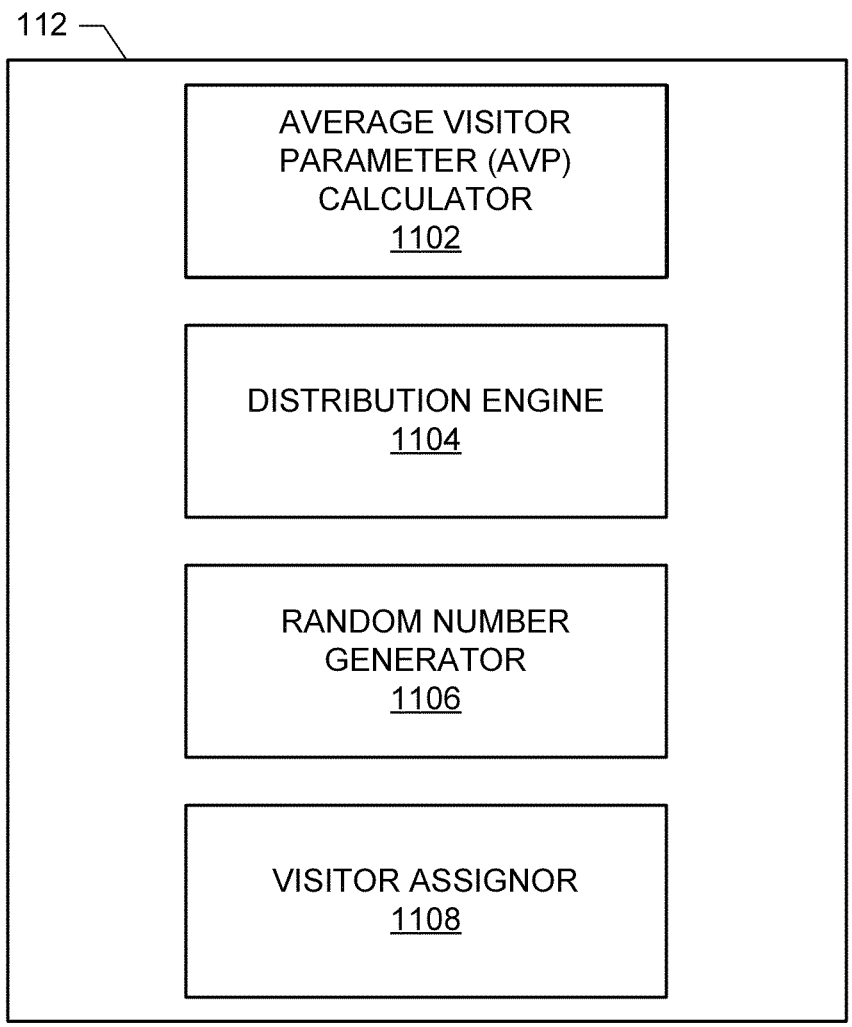
FIG. 11 is a schematic illustration of an example visitor imputation engine constructed in accordance with the teachings of this disclosure.

FIG. 11 is a schematic illustration of an example implementation of the example visitor imputation engine 112 of FIG. 1. The example visitor imputation engine 112 of FIG. 1 is constructed in accordance with the teachings of this disclosure, and includes an average visitor parameter (AVP) calculator 1102, a distribution engine 1104, a random number generator 1106, and a visitor assignor 1108. As described above, operation of the example visitor imputation engine 112 may occur in conjunction with one or more portions of the example imputation engine 110 of FIGS. 1 and 2. In operation, the example people meter interface 202 acquires PM data associated with visitors, in which the PM data is from the PM devices located in the example MMPM households 106 that have both MM devices and PM devices. The example PM interface 202 identifies collected visitor data that is within a threshold period of time from a current day in an effort to weight such data according to its relative age, as described above in connection with example Equation (1).

The example visitor imputation engine 112 invokes the example categorizer 206 and/or example category qualifier 226 to categorize the acquired PM visitor data based on one or more categories of interest. As described above, for a given category or categories of interest, particular households associated with such categories are identified. Depending on whether a threshold number of households exist in the donor pool of visitor data that match all of the desired categories of interest, the example AVP calculator 1102 will invoke a corresponding AVP calculation technique. For example, if more than a threshold number of households exist that have the desired categories of interest (e.g., 30 households), then the cell category approach may be used to calculate AVP, while the independent category approach may be used to calculate AVP, such as the independent category approach described in connection with example FIG. 5.

In the event the threshold number of households exist for a given set of categories of interest, the example AVP calculator 1102 calculates the AVP in a manner consistent with example Equation 8, and shown in FIG. 12. In the illustrated example of FIG. 12, categories of interest include particular tuning characteristics 1202 (e.g., households that watch Disney station between 12:30 and 5:00 PM on Mondays through Fridays) and particular household characteristics 1204 (e.g., households in an Older Family Life Stage with 2 television sets). Additionally, the example analysis of FIG. 12 is performed for two types of visitors; one associated with females age 6-11 (column 1206) and one associated with males age 55-64 (column 1208). Among households that matched the desired set of characteristics of interest exhibited (as determined by collected PM visitor data), there were 3,892 minutes of visitor female age 6-11 exposure (cell 1210) and 3,109 total household tuning minutes (cell 1212). Application of example Equation 8 yields an AVP of 1.252 (cell 1214) for such visitors that are female age 6-11. Additionally, households that matched the desired set of characteristics of interest exhibited 1,081 minutes of visitor male age 55-64 exposure (cell 1216), and the total household tuning minutes (cell 1218) remains the same at 3,109. Application of example Equation 8 yields an AVP of 0.348 (cell 1220) for such visitors that are male age 55-64.

On the other hand, in the event a threshold number of households are not available for the desired categories of interest (e.g., less than 30 households), then the example AVP calculator 1102 calculates the AVP in a manner consistent with Equation 8 after determining expected exposure minutes and expected tuning minutes as category proportions, as described above in connection with FIG. 5. FIG. 13 illustrates example tuning data and exposure data for target demographic of females age 6-11, where the threshold number of households meeting the category combination of interest (e.g., life-stage=older family plus TV sets=2) were not available. In the illustrated example of FIG. 13, households reflecting the category "Life Stage=Older Family" exhibited 443,940 female age 6-11 visitor exposure minutes (cell 1302) and 733,317 tuning minutes (cell 1304), and households reflecting the category "TV Sets=2" exhibited 150,844 female age 6-11 visitor exposure minutes (cell 1306) and 285,877 tuning minutes (cell 1308). Additionally, a total amount of female age 6-11 visitor exposure minutes exhibited 1,741,474 minutes (cell 1310), and a total amount of household tuning minutes exhibited 8,200,347 minutes (cell 1312).

The example AVP calculator 1102 and/or the example distribution engine 230 calculates an exposure proportion for each category of interest 1314 and a tuning proportion for each category of interest 1316. Continuing with the illustrated example of FIG. 13, the exposure proportion associated with the life stage category is the ratio of visitor exposure minutes to total viewing minutes to yield a proportion factor of 0.255 (result 1318). Additionally, the exposure proportion associated with the TV sets category is 0.087 (result 1320). The example tuning proportion associated with the life stage category is the ratio of household tuning minutes to total tuning minutes to yield a tuning proportion of 0.089 (result 1322), and a tuning proportion of 0.035 associated with the TV sets category (result 1324). While the illustrated example of FIG. 13 includes two (2) categories of interest, example methods, apparatus, systems and/or articles of manufacture may include any number of categories of interest.

The example AVP calculator 1102 calculates an expected exposure minutes value (cell 1326) as the product of the total exposure minutes (cell 1310) and any number of calculated exposure proportion values that occur based on the number of categories of interest (e.g., result 1318 and result 1320). The example AVP calculator 1102 also calculates an expected tuning minutes value (cell 1328) as the product of the total tuning minutes (cell 1312) and any number of calculated tuning proportion values that occur based on the number of categories of interest (e.g., result 1322 and result 1324). In a manner consistent with example Equation 8, the example AVP calculator 1102 calculates the AVP value (cell 1330), which is used to determine a number of visitors and associated ages, as described in further detail below.

To determine a number of visitors and corresponding ages, example methods, apparatus, systems and/or articles of manufacture disclosed herein employ a distribution model. While the type of distribution model described below is a Poisson distribution, this distribution is used for example purposes and not limitation. The Poisson distribution is a discrete probability distribution to express the probabilities of given numbers of events when their average rate is known, and applied herein to assign a number of visitors watching a given tuning segment (the previously calculated AVP being the known average rate). Probabilities for the Poisson distribution are defined in a manner consistent with example Equation 10.

$$p(v) = \frac{(\lambda_d^v * e^{-\lambda_d})}{v!}.$$ Equation 10

In the illustrated example of Equation 10, v reflects a number of visitors, p(v) reflects a probability calculated for "v" visitors, and $\lambda_d$ reflects the AVP for a given demographic group of interest (e.g., female age 6-11). The example distribution engine 1104 defines the distribution, such as the example Poisson distribution above, and calculates probability values for a candidate number of visitors of interest, as shown in further detail in FIG. 14.

Figure 14:
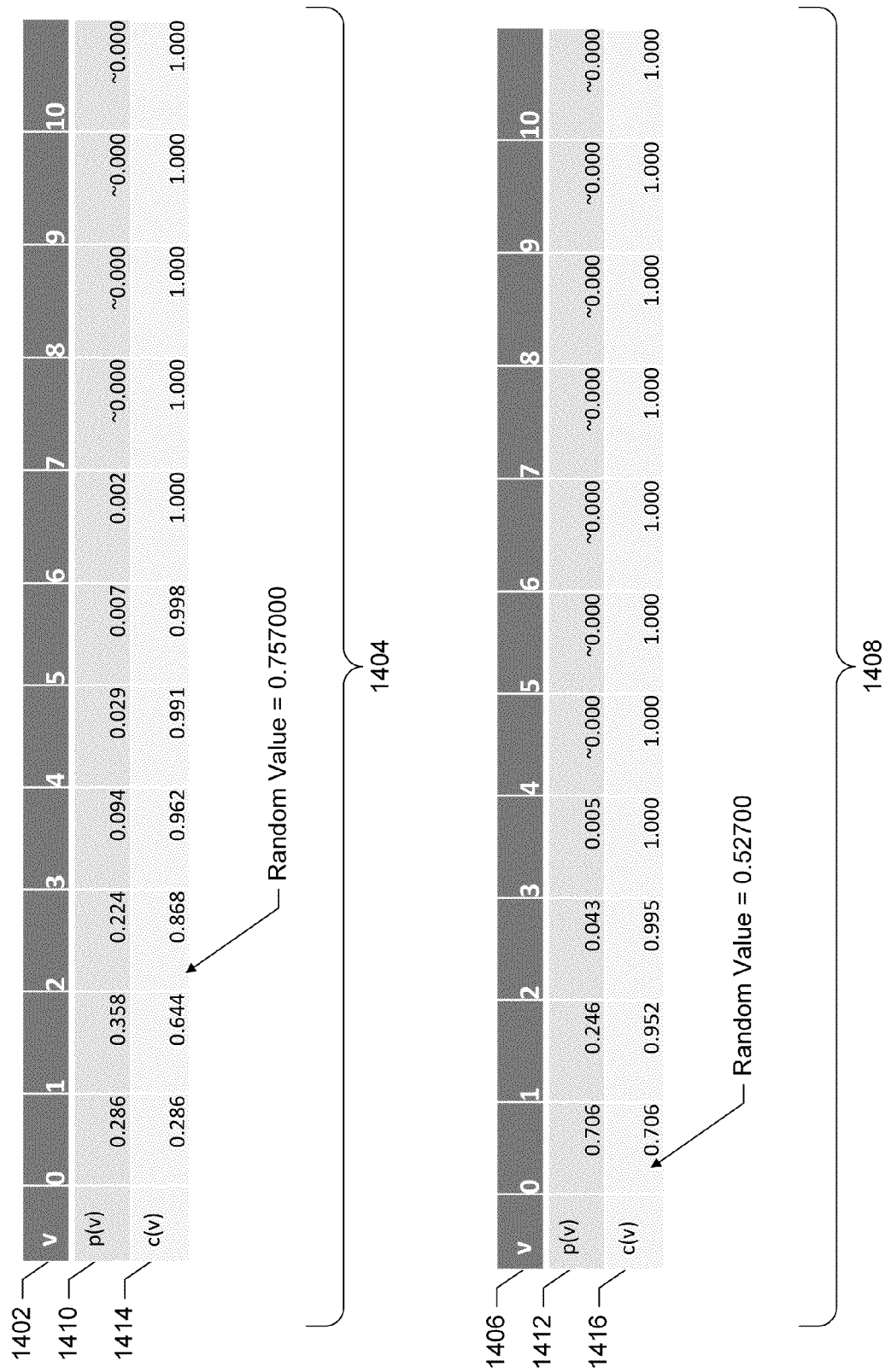
FIG. 14 are example probability values and cumulative probability values generated by the example visitors imputation engine of FIGS. 1 and 11.

In the illustrated example of FIG. 14, eleven (11) different number of visitor values 1402 are selected by the example distribution engine 1104 for a first demographic group of interest 1404 (e.g., female age 6-11), and eleven (11) different number of visitor values 1406 are selected by the example distribution engine 1104 for a second demographic group of interest 1408 (e.g., male age 55-64). For each discrete number of visitor value, the example distribution engine 1104 calculates a corresponding probability value (see row 1410 associated with females age 6-11, and see row 1412 associated with males age 55-64). The example distribution engine 1104 also calculates the corresponding cumulative probabilities c(v) within each demographic group of interest (see row 1414 associated with females age 6-11, and see row 1416 associated with males age 55-64). The example cumulative distribution of FIG. 14 allows arrangement of the probabilities between boundaries of zero and one as a matter of convenience such that the example random number generator 1106 can identify a lookup value.

For each demographic group of interest, the example visitor assignor 1108 invokes the random number generator 1106 to generate a random number that, when referenced against the cumulative distribution values, reveals a number of visitors to attribute to that demographic group of interest. For example, if the random number generator produces a value of 0.757000 for the first group 1404 associated with females age 6-11, then this value is associated by the example visitor assignor 1108 to fall within a visitor (v) value of 2. Additionally, if the random number generator produces a value of 0.52700 for the second group 1408 associated with males age 55-64, then this value is associated by the example visitor assignor 1108 to fall within a visitor (v) value of 1. As a result, the first group 1404 is deemed to have two visitors, each having an age somewhere between 6-11, and the second group 1408 is deemed to have one visitor having an age somewhere between the ages of 55-64. The example random number generator 1106 is again employed to randomly assign corresponding ages for each of the two visitors from the first group 1404 between the ages of 6-11, and to randomly assign an age for the visitor from the second group 1408 between the ages of 55-64. While the aforementioned example was performed for a target demographic group of interest of females between the ages of 6-11 and males between the ages of 55-64, the same process may be repeated for all demographic groups of interest to possibly assign other visitors to a given tuning segment.

The program 1500 of FIG. 15 begins at block 1502 where the example PM interface 202 acquires and identifies data associated with visitors that have selected visitor button(s) of panelist households within a region of interest (e.g., a DMA). The example weighting engine 210 applies weights to the collected visitor data in proportions that are based on an amount of time since the date of collection of the donor data (block 1504). As described above, index value data points that are more recent in time generally reside closer to an index value of 1.00 (see FIG. 3). In other words, an accuracy of the viewing index is better when the corresponding collected data is more recent.

When performing an analysis of a market of interest, the example categorizer 206 categorizes the acquired PM data based on one or more categories of interest (block 1506). As described above, categories of interest may include, but are not limited to an age/gender combination of interest, a particular household size of interest, a particular life stage of interest, a particular viewed station/affiliate/genre of interest, a particular daypart of interest, a number of television sets of interest within the household (e.g., households with one television set, households with 2-3 television sets, households with three or more television sets, etc.), and/or an education level of the head of household. While a relatively large number of MMPM households 106 will have at least one of the aforementioned categories, a substantially smaller number of MMPM households 106 will represent all of the target combination of categories of interest to a market researching during a market study.

If the example visitor imputation engine 112 determines that a threshold number of households associated with a preferred and/or otherwise desired set of characteristics is satisfied (e.g., a threshold of at least 30 households) (block 1508), then the AVP value(s) are calculated by the example AVP calculator 1102 in a manner consistent with FIG. 12 (block 1510). On the other hand, in the event the example visitor imputation engine 112 determines that a threshold number of households is not satisfied (block 1508), then the AVP value(s) are calculated by the example AVP calculator 1102 in a manner consistent with FIG. 13 (block 1512). In particular, the example AVP calculator 1102 and/or the example distribution engine 230 calculates an exposure proportion for each category of interest, and calculates a tuning proportion for each category of interest. The product of each calculated category-specific exposure proportion and total exposure minutes yields expected exposure minutes, and the product of each calculated category-specific tuning proportion and total tuning minutes yields expected tuning minutes. The resulting expected exposure minutes and expected tuning minutes are applied to example Equation 8 to generate corresponding AVP values.

The example distribution engine 1104 defines a distribution model to apply, such as the Poisson distribution (block 1514), and calculates probabilities for any number of visitors (v) of interest in a manner consistent with example Equation 10 (block 1516). For example, FIG. 14 illustrates eleven (11) different number of visitor values 1402 from zero (0) to ten (10). The example distribution engine 1104 also calculates cumulative probabilities so that selections from the distribution can be selected from values bounded between zero (0) and one (1) (block 1518). The example distribution engine 1104 invokes the random number generator 1106 to select a corresponding number of visitors (v) from the cumulative probabilities set for each demographic set of interest (block 1520). Once each demographic set of interest has a determined number of visitors, bounded age values are randomly selected for each visitor to be associated with tuning minutes (block 1522).

Ambient Tuning

As described above, employing a MM without a PM to characterize household media exposure behavior facilitates substantial cost savings when compared to employing PM devices, which may be physically connected to media devices (e.g., televisions) and require professional installation. For example, a MM may be mailed to a panelist, plugged in to power and function without professional installation and/or without connection to the panelist's electronics (e.g., media electronics such as DVD players, set top boxes, televisions, etc.). Although using MM devices without PMs result in substantial panelist household cost savings, some households have two or more media devices located in rooms in a relative proximity to where sound from a first media device reaches the room in which the second media device is located, and vice versa. In such circumstances, a MM device from the first room may incorrectly credit exposure minutes based on audio spillover associated with the second media device in the second room (and vice versa). When MM devices incorrectly credit exposure minutes, one or more household tuning estimates and/or projections may be overreported/inflated. Example methods, apparatus, systems and/or articles of manufacture disclosed herein distinguish instances of ambient tuning (e.g., due to spillover) from instances of real tuning.

Figure 16:
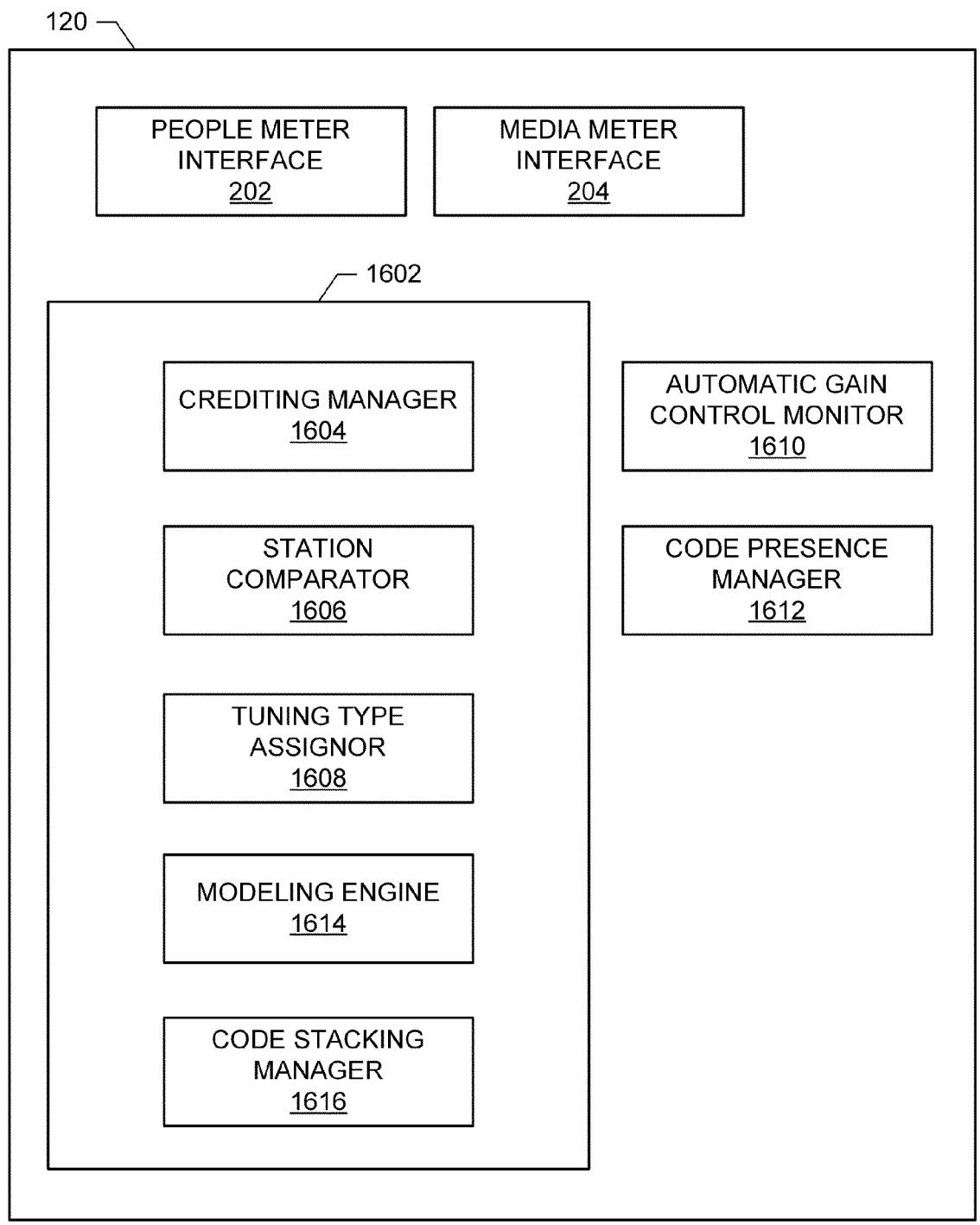
FIG. 16 is a schematic illustration of an example ambient tuning engine constructed in accordance with the teachings of this disclosure

FIG. 16 is a schematic illustration of an example implementation of the example ambient tuning engine 120 of FIG. 1. The example ambient tuning engine 120 of FIG. 1 is constructed in accordance with the teachings of this disclosure. In the illustrated example of FIG. 16, the ambient tuning engine 120 includes the PM interface 202 and the MM interface 204 as disclosed above in connection with FIG. 2. Additionally, the illustrated example of FIG. 16 includes a simultaneous tuning monitor 1602, a crediting manager 1604, a station comparator 1606, a tuning type assignor 1608, a modeling engine 1614, a code stacking manager 1616, an automatic gain control (AGC) monitor 1610 and a code presence manager 1612.

In operation, the example PM interface 202 and the example MM interface 204 collect household tuning data from MMPM households 106 and MMH households 108 within a region of interest 104 (e.g., panelist households within a direct marketing area (DMA)) that comprise an available data pool (e.g., LPM households, NPM households, etc.). The example ambient tuning engine 120 invokes the example simultaneous tuning monitor 1602 to identify whether instances of simultaneous tuning minutes from collected household data are either ambient or real. As used herein, "simultaneous tuning" refers to instances where two or more meters within a household are detecting the same media (e.g., the same television station). To illustrate, assume a first MM proximate to a first television in a first room detects station WAAA, and a second MM proximate to a second television in a second room also detects station WAAA. One possibility that may be true is that both media devices (e.g., televisions) are powered on and tuned to station WAAA. However, another possibility is that the first television is on and tuned to station WAAA while the second television is tuned to another station while muted. Yet another possibility is that the first television is on and tuned to station WAAA while the second television is not powered on. In such circumstances, the second MM device may be detecting audio (e.g., spillover) from the first television and, thus, improperly inflating media exposure (e.g., consumption) metrics associated with the second television and/or household members.

In some examples, the crediting manager 1604 identifies quantities of time (e.g., minutes) where the MM device credited a station, and the example station comparator 1606 determines whether an AP device paired with the MM device is also crediting the same station. If so, then the example tuning type assignor 1608 assigns the corresponding tuning minute as real. On the other hand, if the example crediting manager 1604 identifies minutes where the MM devices credited a station (e.g., embedded codes detected by the MM device, embedded codes passed-on by the MM device and detected by the ambient tuning engine 120 during post-processing, signature post processing, etc.), and the example station comparator 1606 determines that the paired AP device is not tuned to the same station, then the example station comparator 1606 determines whether a separate metering device within the household is tuned to the same station, such as another AP and/or MM device associated with a second television in a second room of the household. If so, then that household tuning minute is deemed and/or otherwise labeled as ambient tuning/spillover, which should be ignored to prevent improper overrepresentation. On the other hand, in the event the example station comparator 1606 determines that no other metering device in the household is also tuned to the same station, then the example tuning type assignor 1608 assigns the minute as non-tuning. The example simultaneous tuning monitor 1602 continues to evaluate each received tuning minute within the pool of data collected from the example panelist households 104.

To develop a stochastic approach to determine the occurrence of spillover in which derived model coefficients are derived for use in MMH households 108, the example ambient tuning engine 120 collects additional predictive variables indicative of the occurrence or non-occurrence of spillover. The predictive variables are applied to a model, such as a regression model, to generate coefficients/parameters that facilitate calculation of a probability that spillover is occurring or not occurring within the MMH households 108. At least three predictive variables indicative of the occurrence or non-occurrence of spillover include automatic gain control (AGC) values, the presence of embedded codes, such as final distributor audio codes (FDACs), and the duration of the collected segment.

Generally speaking, by comparing AGC values between two separate MM devices within a household (e.g., calculating a difference therebetween), an indication of spillover may be evaluated. A MM device placed relatively close to a first television, for example, is more likely to have a low AGC value because of a higher relative volume when compared to an AGC value associated with sound from a television relatively farther away. AGC values are typically established by acoustic gain circuits that apply greater gain (e.g., amplification) when attempting to discern and/or otherwise detect sound energy that has a relatively low volume than when attempting to detect sound energy of a higher volume. Volume may be lower, for example, due to a greater distance from a source of the originating sound energy. Additionally, quantities and/or densities of detected codes per unit of time are additional example predictive variable(s) that may be applied to the model to derive an indication of the likelihood of the occurrence or non-occurrence of spillover. Without limitation, segment duration is another predictive variable useful in the indication of spillover, as described in further detail below.

The example AGC monitor 1610 of FIG. 16 assigns each collected minute to a corresponding AGC value. The example code presence manager 1612 of FIG. 16 assigns each collected minute an indicator corresponding to the presence or absence of an embedded code. In some examples, code detection activit(ies) may occur during post processing of raw audio information collected by meter(s). In other examples, the codes are detected in real time or near real time. The example ambient tuning engine 120 of FIG. 16 segregates instances of simultaneous tuning minutes based on whether embedded codes have been detected. For example, the modeling engine 1614 prepares a regression model with dependent variables reflecting the previously determined real or ambient status occurrence(s). The example AGC monitor 1610 determines a minimum (e.g., lowest) AGC for the household devices for a particular monitored time period and/or collected set of audio data. For each device and minute, the example AGC monitor 1610 determines an AGC difference value with respect to the minimum AGC value and each collected minute.

The example code presence manager 1612 of FIG. 16 identifies one of three possible scenarios for the type and presence of codes in collected MM data for devices (e.g., TV sets, radio, etc.) within a household. A first possible scenario is that no codes are present in the collected MM data for any of the devices of the household of interest. A second possible scenario is that the collected MM data has some codes for some of the devices within the household, but not all of the devices have associated codes detected in the collected minutes. A third possible scenario is that the collected MM data for the household has codes in all of the data collected. In other words, each collected minute of tuning data has corresponding codes in all devices within that household.

If none of the meters within the household have collected codes in the collected minutes, then the example simultaneous tuning monitor 1602 of FIG. 16 places a greater weight on a type of segment duration for the household. For instance, if a television is tuned to station WAAA, then the MM device closest to that television will have a relatively longer collected segment duration than a MM device located further away from the television. The sound emanating from a television located further away from that same MM device may fluctuate in intensity such that the MM device may not capture full segment durations. The example simultaneous tuning monitor 1602 of FIG. 16 identifies, for each household, a longest (e.g., maximum) segment duration and calculates a duration difference to be applied to the logistic regression fit of the collected data in a manner consistent with example Equation (11).

$$\text{Log}\left[\frac{\text{Probability (Simultaneous Minute} = \text{Ambient)}}{\text{Probability (Simultaneous Minute} = \text{Real)}}\right] = \quad \text{Equation (11)}$$
$$B_0 + B_1 X_1 + \ldots + B_k X_k$$

In the illustrated example of Equation (11), the model has the response (dependent) dependent variable as the ambient or real value to which each simultaneous tuning minute is assigned. Independent variables $X_1, \ldots, X_k$ may be coded and/or otherwise categorized with model coefficients $B_1, \ldots, B_k$. Categories may be represented by any scale, such as AGC values ranging from zero to one hundred having sub-groups therein.

If some of the meters within the household have collected codes in the collected minutes (e.g., collected raw audio with codes embedded therein and subsequently identified during audio data post processing), but others do not, then the example modeling engine 1614 of FIG. 16 builds a model in a manner consistent with example Equation (11) using data associated with the AGC difference values. If all of the meters within the household have collected codes in the collected minutes, then the example code stacking manager 1616 determines a maximum unstacked count and a maximum stacked count for the household devices. As used herein, a stacked code refers to an instance of code repair and/or imputation when part of a code is detected. In such cases where the entire code content is not correctly collected by the MM device, a stacking procedure fills-in portions of the code that were not detected. Generally speaking, meter devices (e.g., MMs) that are relatively closer to the media device (e.g., television) will have a better ability to collect unstacked codes that are not in need of repair or padding due to, for example, a relatively closer proximity to the meter device(s). However, when the meter devices operate at a distance relatively farther away from the monitored device, the ability for the meter devices to accurately collect the entire code becomes more difficult and erroneous. The code stacking manager 1616 of the illustrated example determines a difference between meter devices within the household of the stacked and unstacked count values, which is applied to the model. Additionally, the simultaneous tuning monitor 1602 of the illustrated example identifies a maximum average of seconds of collected code for all meter devices within the household, and calculates a difference between those household devices. The difference of seconds of collected code, the stacked and unstacked code count difference values, and the AGC difference values are applied to the example model of Equation (11) to derive the corresponding model coefficients (e.g., B1, ..., Bk).

As described above, the example code presence manager 1612 of FIG. 16 identifies one of the three possible scenarios for the type and presence of codes in the household and, based on the detected scenario, applies a different combination of predictive variables (e.g., AGC values, segment duration, count of stacked versus unstacked codes). Each of these scenarios applies the corresponding predictive variables to the example model of Equation (11), and the example modeling engine 1614 of FIG. 16 calculates a probability of spillover in a manner consistent with example Equation (12).

$$\text{Probability (Minute = Ambient)} = \frac{1}{[1 + e^{-(B_0 + B_1 X_1 + \ldots + B_k X_k)}]} \quad \text{Equation (12)}$$

Each simultaneous tuning minute may be identified as either ambient tuning or real tuning based on the resulting probability value and a threshold established by, for example, a market researcher. For example, if the probability value is greater than or equal to 0.50, then the minute may be designated as ambient tuning. On the other hand, the minute may be designated as real tuning for probability values less than 0.50.

Figure 17:
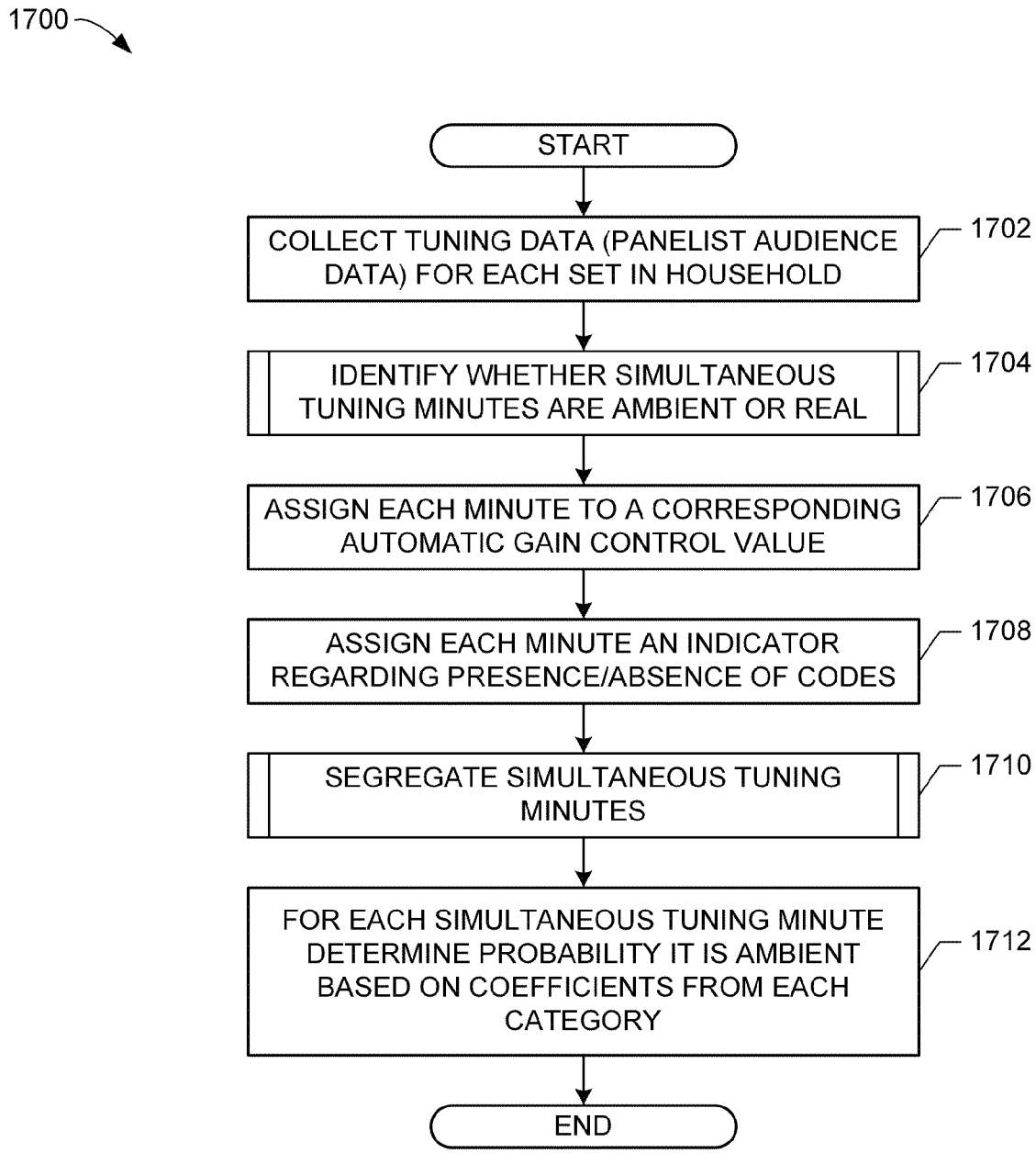
FIGS. 17-19 are flowcharts representative of example machine readable instructions that may be executed to implement the example ambient tuning engine of FIGS. 1, 10 and 16.

The program 1700 of FIG. 17 begins at block 1702 where the example PM interface 202 and the example MM interface 204 of the illustrated example collect tuning data from MMPM households 106 and MMH households 108 within panelist households 104. The example simultaneous tuning monitor 1602 of FIG. 16 identifies whether simultaneous tuning minutes within such households are either ambient or real (block 1704), as described in further detail below in connection with FIG. 18.

Figure 18:
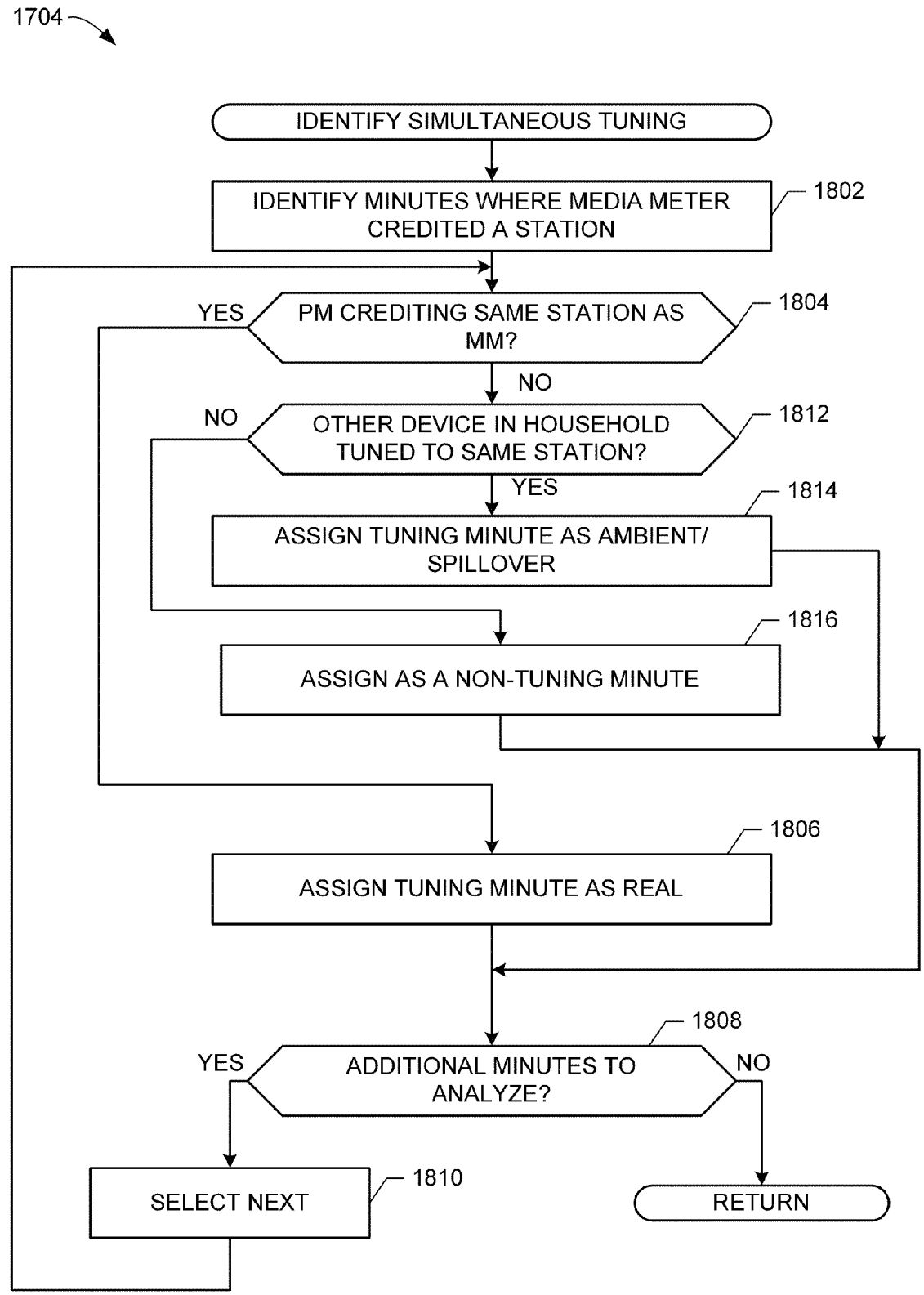

FIG. 18 includes additional detail from the illustrated example of FIG. 17. When identifying whether simultaneous tuning minutes are ambient or real, the example crediting manager 1604 of FIG. 16 identifies minutes where a MM device (e.g., a MM device in the MMPM household 106) within the household of interest credited a station (block 1802). The station comparator 1606 of FIG. 16 determines whether an AP device in the household of interest is also crediting the same station as the MM device at the same time (block 1804). In some examples, the crediting manager 1604 compares a timestamp associated with minutes collected from the MM device with a timestamp associated with minutes collected from the PM device of the same household. If the timestamps match and the detected stations are the same, then the example tuning type assignor 1608 of FIG. 16 assigns that corresponding minute as real tuning (block 1806). The example simultaneous tuning monitor 1602 determines if there are additional minutes from the household of interest to analyze (block 1808). If so, then the example simultaneous tuning monitor 1602 selects the next minute for analysis (block 1810) and control returns to block 1804.

If the example station comparator 1606 of FIG. 16 determines that the AP device is not crediting the same station as the MM device within the household (block 1804), which could be due to multiple media presentation devices (e.g., TV sets) within the household being tuned to different stations or turned off, then the example station comparator 1606 of the illustrated example determines whether the other device is tuned to the same station (block 1812). As described above, example methods, apparatus, systems and/or articles of manufacture disclosed herein employ MMPM households 106 that have both MM devices and PM devices so that ambiguity of actual device behavior is eliminated. Once model coefficients are generated based on such observed behaviors in the MMPM households 106, the data collected from the MMH households 108 may be imputed with the coefficients to allow an indication of spillover to be calculated. As such, panelist households without PMs can be effectively utilized. As a result, a greater number of panelist households may be implemented in the example region of interest 104 without the added capital expense of PM devices that require professional installation, relatively greater training, and/or more routine maintenance than MM devices.

If the example station comparator 1606 determines that the other device in the household is tuned to the same station (block 1812) (e.g., based on the detection of the same codes), then the example tuning type assignor 1608 assigns the corresponding minute as ambient tuning (also referred to herein as spillover) (block 1814). On the other hand, if the example station comparator 1606 determines that the other device in the household is not tuned to the same station (block 1812), then the example tuning type assignor 1608 of the illustrated example assigns the corresponding minute as a non-tuning minute (block 1816).

Returning to FIG. 17, the example AGC monitor 1610 of the illustrated example assigns each minute to a corresponding AGC value (block 1706). As described above, the AGC value associated with a collected minute in some example predictive variables assist in calculating a probability of ambient tuning occurrences. Additionally, another example predictive variable discussed above includes the presence or absence of embedded codes within the collected minute of media. The example code presence manager 1612 of the illustrated example assigns each minute an indicator regarding the presence or absence of embedded codes (block 1708). The example ambient tuning engine 120 segregates instances of simultaneous tuning minutes based on whether such embedded codes have been detected (block 1710), as described further below in connection with FIG. 19.

Figure 19:
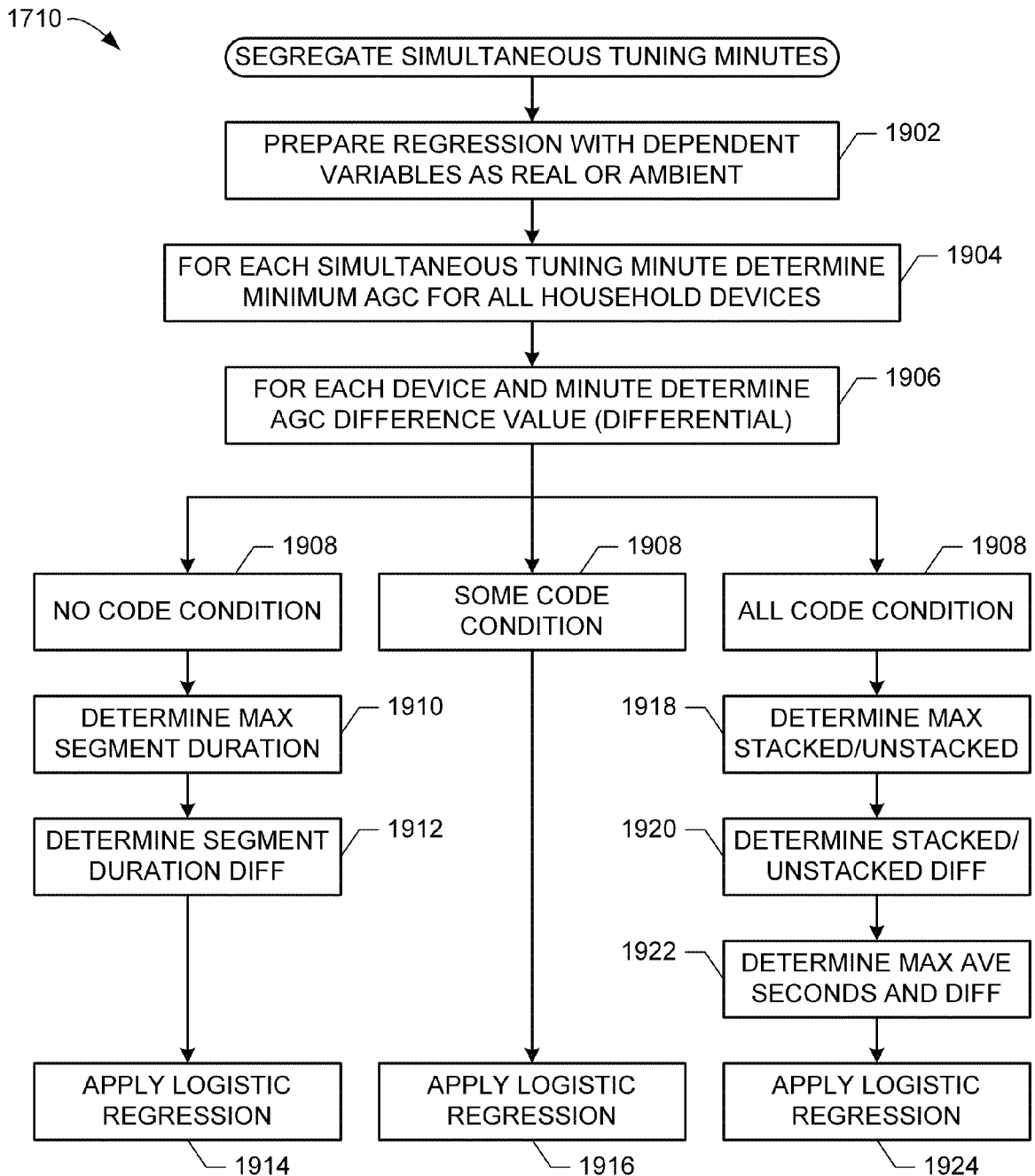

In the illustrated example of FIG. 19 (block 1710), the modeling engine 1614 of the illustrated example prepares a regression model with dependent variables reflecting corresponding real or ambient status indicators (block 1902). For each household device of interest, the example AGC monitor 1610 determines a minimum AGC value across two or more MM devices (block 1904) and determines a difference value therebetween (block 1906). In view of the possibility that the MM devices within the household of interest may either collect no codes, collect some codes for some of the minutes and not others, or collect codes for all of the minutes, the example code presence manager 1612 of the illustrated example identifies which circumstance applies (block 1908).

If the example code presence manager 1612 of the illustrated example identifies a first category in which no codes are detected, the example simultaneous tuning monitor 1602 determines a maximum segment duration associated with the MM devices (block 1910), and calculates a difference therebetween (block 1912). The example modeling engine 1614 of FIG. 16 applies a logistic regression fit to the collected data in a manner consistent with example Equation (11) (block 1914), as described above. In particular, when the household does not detect any codes in the collected minutes, the example model of Equation (11) is tailored to consider (1) the AGC values and (2) differences in collected segment durations (block 1914).

If the example code presence manager 1612 of the illustrated example identifies a second category in which some codes are detected in some minutes, while no codes are detected in other minutes (block 1908), then the example modeling engine 1614 of FIG. 16 applies a logistic regression fit to the collected data in a manner consistent with example Equation (11) (block 1916). However, in this application of example Equation (11), the model employs (1) the AGC values and (2) the presence or absence of codes in corresponding collected minutes (block 1916).

If the example code presence manager 1612 identifies a third category in which all codes are detected in all collected minutes (block 1908), then the example code stacking manager 1616 of this example determines whether the detected codes are, themselves, complete (block 1918). As described above, while the example MM devices may detect and/or otherwise capture codes that may have been embedded in media from a media device (e.g., a television), the quality of the detected codes may differ. Such differences may be due to, for example, the MM device collecting audio from a television that is relatively far away from where the MM device is located. In such situations, one or more stacking operations may supplement missing portions of the detected code with accurate code data. The example code stacking manager 1616 of this example identifies a difference between MM devices in the household regarding the number of stacked codes versus unstacked codes detected (block 1920). Additionally, the example simultaneous tuning monitor 1602 calculates an average (e.g., a maximum average) seconds of code per metering device in the household, and a corresponding difference value between each metering device (block 1922). The example modeling engine 1614 of the illustrated example applies the logistic regression fit to the collected data in a manner consistent with example Equation (11) (block 1924). However, in this application of example Equation (11), the model employs (1) the AGC values, (2) the differences between stacked/unstacked embedded codes and (3) the differences between the average number of seconds of code between metering devices (block 1924).

Returning to FIG. 17, the example modeling engine 1614 of this example applies calculated coefficients from the model (e.g., Equation (11)) to a probability calculation in a manner consistent with example Equation (12) to determine a probability that tuning for a given minute should be categorized as spillover (ambient tuning) (block 1712).

On/Off Detection

As described above, employing a MM to characterize household media viewing behavior may be performed in a stochastic manner rather than by employing a PM to save money that would otherwise be spent on the relatively expensive PM devices. When a MM device is employed to collect audio signal (tuning) data from a household, some of the collected minutes may include codes (e.g., embedded codes collected in the raw audio and passed on to the on/off detection engine 130 for post processing), some of the collected minutes may be analyzed via signature analysis (e.g., analysis of the raw audio collected by the MM device and passed on to the on/off detection engine 130 for audio signature comparison against one or more signature database(s)), and some of the collected minutes may have neither codes nor have corresponding signature matches for media identification.

Figure 20:
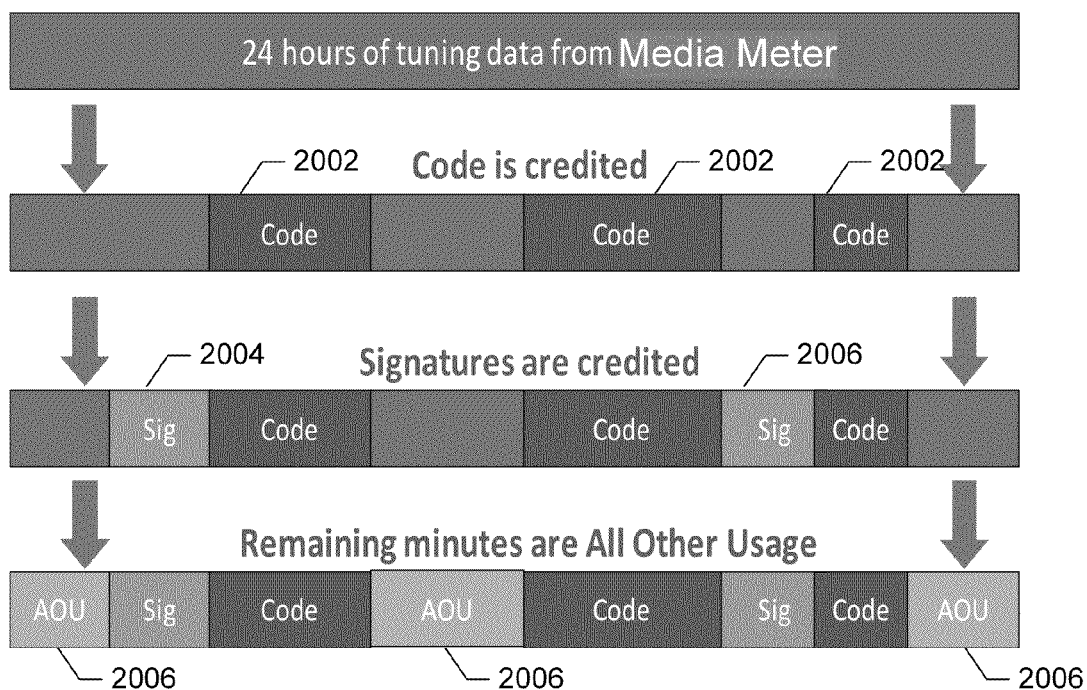
FIG. 20 is an example crediting chart illustrating example categories of collected viewing minutes.

FIG. 20 illustrates an example crediting chart 2000 having a block of twenty-four (24) hours of tuning data collected from an example MM device in an example household. In the illustrated example of FIG. 20, some portions of collected minutes from the household are associated with codes 2002, which also indicates that a media device (e.g., a television) within the household is turned on. Additionally, some portions of collected minutes from the household are associated with signatures of the detected media 2004 that, when compared to a reference database, allow identification of media. However, still other portions of collected minutes from the household have neither codes nor signatures that match known media in a reference database 2006.

Minutes that have neither codes nor corresponding signatures that may be used with a reference database are referred to herein as all other tuning (AOT) minutes. In such circumstances with a PM device, the media device (e.g., television) will be detected in an on state (e.g., power status ON based on a power status detector of the PM device), but no station and/or media can be credited with tuning. In other circumstances, a media device may be in a muted state or an off state (e.g., power status OFF), thus no audio is emitted that can be used for crediting. Example methods, systems, apparatus and/or articles of manufacture disclosed herein apply a stochastic manner of determining whether AOT minutes are associated with an off state or an on state, which may be associated with other media device usage separate from media programming (e.g., video game usage, video conferencing, etc.).

Figure 21:
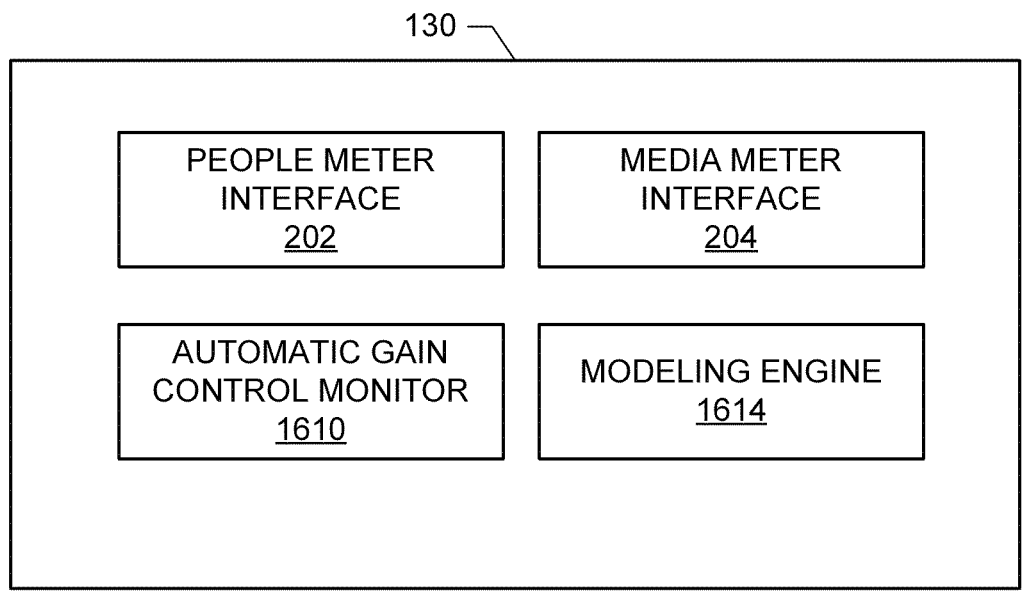
FIG. 21 is a schematic illustration of an example on/off detection engine constructed in accordance with the teachings of this disclosure.

FIG. 21 is a schematic illustration of the example on/off detection engine 130 of FIG. 1 and constructed in accordance with the teachings of this disclosure. In the illustrated example of FIG. 21, the on/off detection engine 130 includes the PM interface 202, the MM interface 204, the AGC monitor 1610 and the modeling engine 1614 as disclosed above in connection with FIGS. 2 and 16.

In operation, the example PM interface 202 collects minutes from a PM device (e.g., an active/passive people-meter) within the household related to three categories of media device usage. A first category of media device usage associated with some collected minutes is related to a particular station or media, such as media identified by way of codes or signature matching. A second category of media device usage associated with other collected minutes is related to instances of non-programming related usage, such as video game play, video conferencing activity, home picture viewing, etc. A third category of media device usage associated with still other collected minutes is related to instances where the media device is powered off.

The example MM interface 204 also collects minutes from a MM device within the household. As described above, because the MM interface 204 is not physically connected to the media device, it cannot directly verify whether the media device is powered on and, instead, collects only audio-based information via one or more built-in microphones. The example MM interface 204 may collect minutes data that either credits a station or media, or designates the collected minutes as AOU. The example AGC monitor 1610 collects AGC values from each of the example MM interface 204 and the example PM interface 202 for each corresponding minute, and the example modeling engine 1614 prepares a regression model to fit the collected data in a manner consistent with example Equation (13).

$$\text{Log}\left[\frac{\text{Probability (Given Minute} = HUT)}{\text{Probability (Given Minute} = \text{OFF})}\right] = B_0 + B_1 X_1 + \dots + B_k X_k \quad \text{Equation (13)}$$

In the illustrated example of Equation (13), HUT is indicative of a "household using television" on (e.g., an ON power status), off is indicative of an OFF power status, and the independent variables (X) include AGC values, daypart information and/or a number of minutes since a code reader credit occurred.

The example modeling engine 1614 uses derived coefficients (B) to calculate a probability for each minute as either on (HUT) or off in a manner consistent with example Equation (14).

$$\text{Probability } (AOU \text{ Minute} = HUT) = \frac{1}{[1 + e^{-(B_0 + B_1 X_1 + \dots + B_k X_k)}]} \quad \text{Equation (14)}$$

Figure 22:
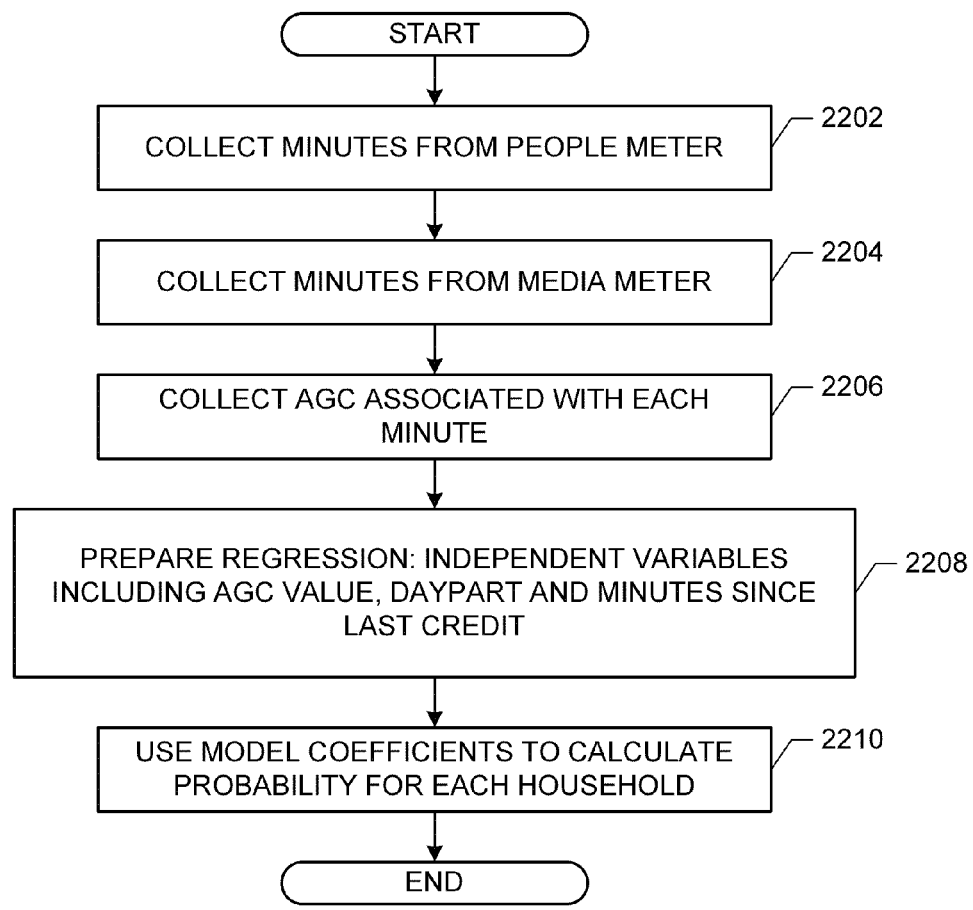
FIG. 22 is a flowchart representative of example machine readable instructions that may be executed to implement the example on/off detection engine of FIGS. 1 and 21.

The program 2200 of FIG. 22 begins at block 2202 where the example PM interface 202 collects minutes from the PM device related to minutes where a station was credited, minutes where the television was in use, but had no crediting, and where the television was powered off. The example MM interface 204 collects minutes from the MM device in the dual panel household related to minutes where a station was credited, and minutes of AOU (block 2204). The example AGC monitor 1610 collects AGC values associated with each minute collected by the example PM interface 202 and MM interface 204 (block 2206).

The example modeling engine 1614 prepares a model based on AGC values, day parts and a number of minutes since a last MM device credit in a manner consistent with example Equation (13) (block 2208). The model may include, but is not limited to, a regression model, in which coefficients may be derived after fitting the collected data. The derived model coefficients are used by the example modeling engine 1614 to calculate a probability that any particular minute of interest was associated with either an on state or an off state of the household media device. These derived coefficients may be associated with panelist households within the region of interest 104 having only MM devices 108 (block 2210).

Figure 23:
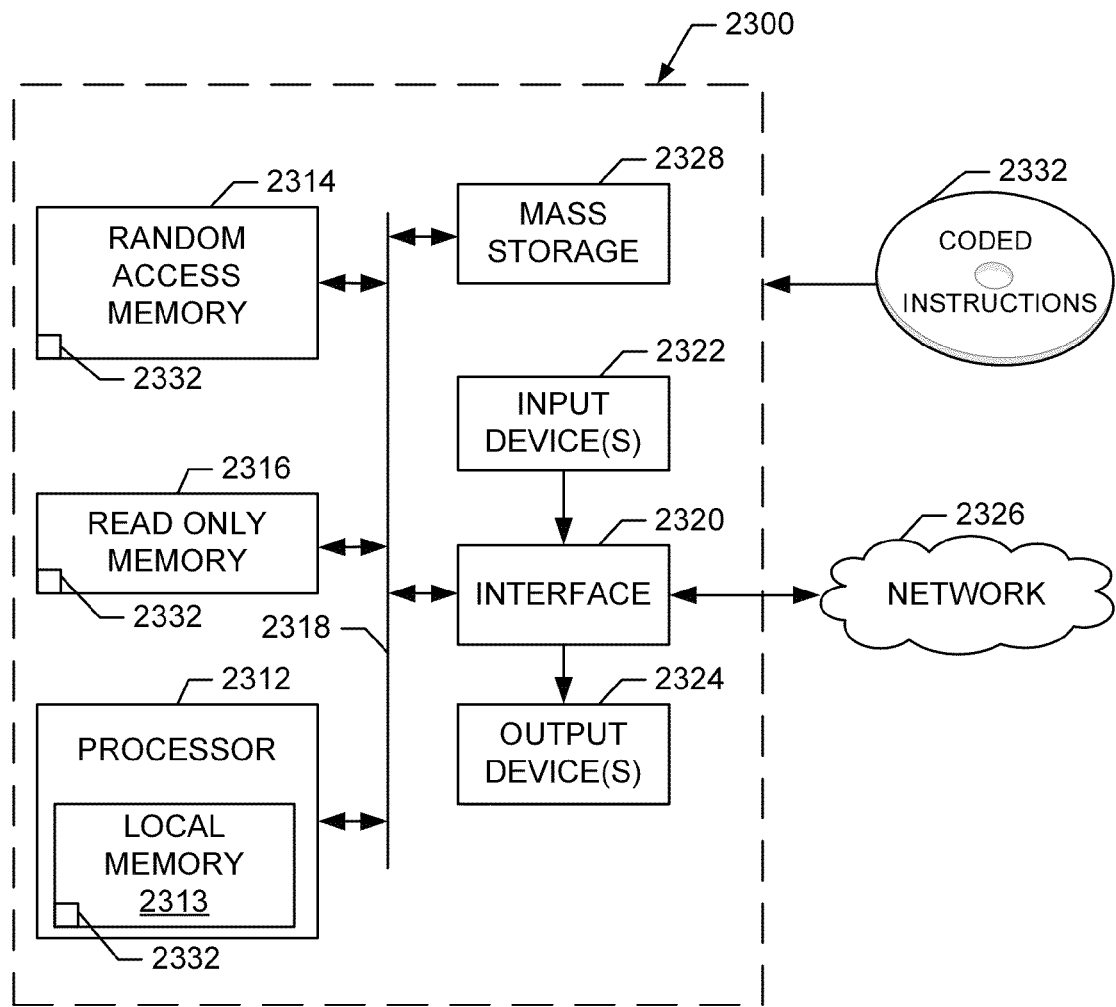
FIG. 23 is a schematic illustration of an example processor platform that may execute the instructions of FIGS. 6-9, 15, 17-19 and/or 22 to implement the example ambient tuning engine, the example imputation engine and the example on/off detection engine of FIGS. 1, 2, 10, 16 and/or 21.

FIG. 23 is a block diagram of an example processor platform 2300 capable of executing the instructions of FIGS. 6-9, 15, 17-19 and 22 to implement the ambient tuning engine 120, the imputation engine 110, the visitor imputation engine 112, and the on/off detection engine 130 of FIGS. 1, 2, 11, 16 and 21. The processor platform 2300 can be, for example, a server, a personal computer, an Internet appliance, a digital video recorder, a personal video recorder, a set top box, or any other type of computing device.

The processor platform 2300 of the illustrated example includes a processor 2312. The processor 2312 of the illustrated example is hardware. For example, the processor 2312 can be implemented by one or more integrated circuits, logic circuits, microprocessors or controllers from any desired family or manufacturer.

The processor 2312 of the illustrated example includes a local memory 2313 (e.g., a cache). The processor 2312 of the illustrated example is in communication with a main memory including a volatile memory 2314 and a non-volatile memory 2316 via a bus 2318. The volatile memory 2314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2316 may be implemented by flash memory and/or any other desired type of memory device. Access to the main memory 2314, 2316 is controlled by a memory controller.

The processor platform 2300 of the illustrated example also includes an interface circuit 2320. The interface circuit 2320 may be implemented by any type of interface standard, such as an Ethernet interface, a universal serial bus (USB), and/or a PCI express interface.

In the illustrated example, one or more input devices 2322 are connected to the interface circuit 2320. The input device(s) 2322 permit(s) a user to enter data and commands into the processor 2312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 2324 are also connected to the interface circuit 2320 of the illustrated example. The output devices 2324 can be implemented, for example, by display devices (e.g., a light emitting diode (LED), an organic light emitting diode (OLED), a liquid crystal display, a cathode ray tube display (CRT), a touchscreen, a light emitting diode (LED), a printer and/or speakers). The interface circuit 2320 of the illustrated example, thus, typically includes a graphics driver card, a graphics driver chip or a graphics driver processor.

The interface circuit 2320 of the illustrated example also includes a communication device such as a transmitter, a receiver, a transceiver, a modem and/or network interface card to facilitate exchange of data with external machines (e.g., computing devices of any kind) via a network 2326 (e.g., an Ethernet connection, a digital subscriber line (DSL), a telephone line, coaxial cable, a cellular telephone system, etc.).

The processor platform 2300 of the illustrated example also includes one or more mass storage devices 2328 for storing software and/or data. Examples of such mass storage devices 2328 include floppy disk drives, hard drive disks, compact disk drives, Blu-ray disk drives, RAID systems, and digital versatile disk (DVD) drives.

The coded instructions 2332 of FIGS. 6-9, 15, 17-19 and 22 may be stored in the mass storage device 2328, in the volatile memory 2314, in the non-volatile memory 2316, and/or on a removable tangible computer readable storage medium such as a CD or DVD.

From the foregoing, it will be appreciated that the above disclosed methods, apparatus and articles of manufacture allow audience measurement techniques to occur with a substantially larger quantity of households, in which each household has a substantially lower metering equipment cost by employing audio-based code reader devices instead of relatively more expensive people meter devices. Examples disclosed herein permit a determination of behavior probability that can be applied to households that do not have a People Meter device and, instead, employ a media meter that captures audio without a physical connection to a media device (e.g., a television). Such examples allow behavior probability calculations based on utilization of other households that include the People Meter device, in which the calculations reveal behavior probabilities in a stochastic manner that adheres to expectations of statistical significance.

Example methods, systems, apparatus and/or articles of manufacture disclosed herein also facilitate a stochastic manner of determining a probability of ambient tuning within households that do not employ a People Meter device. In some examples disclosed herein, both a panelist audience meter (e.g., a People Meter) and a media meter (e.g., captures audio without a physical connection to a media device) are employed to obtain data associated with media code status and one or more automatic gain control (AGC) values. Based on the obtained code status and AGC values, examples disclosed herein create model coefficients that may be applied to households with only media meters in a manner that determines a probability of ambient tuning that upholds expectations of statistical significance. Additionally, data obtained related to AGC values are disclosed herein to be used with daypart information to calculate model coefficients indicative of whether a media device (e.g., a television) is powered on or powered off.

Additional example methods, systems, apparatus and/or articles of manufacture disclosed herein identify probabilities of a number of visitors in a household and their corresponding ages. In particular, examples disclosed herein calculate an average visitor parameter (AVP) based on exposure minutes and tuning minutes, which are further applied to a Poisson distribution to determine a probability of having a certain number of visitors in a household. Such probabilities are in view of a target demographic of interest having a particular age range, which may be selected based on inputs from a random number generator.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to calculate a probability of ambient tuning, comprising:
    identifying, with a processor, a household minute credited to a station in a household by a first media meter (MM) device, the first MM device collecting only audio data;
    determining, with the processor, whether a panelist audience meter device is crediting the station at the same time in the household;
    reducing overreporting of the household when the panelist audience meter device is crediting the same station by associating, with the processor, the household minute with an ambient tuning status;
    identifying, with the processor, a first automatic gain control (AGC) value and a first code status of the household minute;
    calculating, with the processor, model coefficients based on the ambient tuning status, the first AGC value and the first code status; and
    calculating, with the processor, a probability of ambient tuning based on the model coefficients.

2. A method as defined in claim 1, further including applying the model coefficients to data from a second MM device in a second household, the second household devoid of a panelist audience meter device.

3. A method as defined in claim 2, further including applying collected household tuning minutes data from the second MM device to a model with the coefficients to calculate the probability of ambient tuning.

4. A method as defined in claim 3, wherein the collected household tuning minute data includes second AGC values and a second code status.

5. A method as defined in claim 1, wherein the code status includes at least one of no detected codes, some detected codes or codes detected in all minutes.

6. A method as defined in claim 5, further including determining whether detected codes are stacked or unstacked.

7. A method as defined in claim 6, wherein calculating model coefficients includes a stacked/unstacked status.

8. An apparatus to calculate a probability of ambient tuning, comprising:
    a crediting manager to identify a household minute credited to a station in a household by a first media meter (MM) device, the first MM device collecting only audio data;
    a station comparator to determine whether a panelist audience meter device is crediting the station at the same time in the household;
    when the panelist audience meter device is crediting the same station, reducing overreporting of the household with a tuning type assignor to associate the household minute with an ambient tuning status;
    an automatic gain control (AGC) monitor to identify a first AGC value and a first code status of the household minute; and
    a modeling engine to calculate model coefficients based on the ambient tuning status, the first AGC value and the first code status, and to calculate a probability of ambient tuning based on the model coefficients.

9. An apparatus as defined in claim 8, wherein the modeling engine is to apply the model coefficients to data from a second MM device in a second household, the second household devoid of a panelist audience meter device.

10. An apparatus as defined in claim 9, wherein the modeling engine is to apply collected household tuning minutes data from the second MM device to a model with the coefficients to calculate the probability of ambient tuning.

11. An apparatus as defined in claim 10, wherein the collected household tuning minute data includes second AGC values and a second code status.

12. An apparatus as defined in claim 8, wherein the code status includes at least one of no detected codes, some detected codes or codes detected in all minutes.

13. An apparatus as defined in claim 12, further including a code stacking manager to determine whether detected codes are stacked or unstacked.

14. An apparatus as defined in claim 13, wherein the modeling engine is to calculate model coefficients based on the stacked or unstacked status.

15. A tangible machine readable storage medium comprising instructions that, when executed, cause a machine to at least:
identify a household minute credited to a station in a household by a first media meter (MM) device, the first MM device collecting only audio data;
determine whether a panelist audience meter device is crediting the station at the same time in the household;
reduce overreporting of the household when the panelist audience meter device is crediting the same station by associating the household minute with an ambient tuning status;
identify a first automatic gain control (AGC) value and a first code status of the household minute;
calculate model coefficients based on the ambient tuning status, the first AGC value and the first code status; and
calculate a probability of ambient tuning based on the model coefficients.

16. A storage medium as defined in claim 15, wherein the instructions, when executed, further cause the machine to apply the model coefficients to data from a second MM device in a second household, the second household devoid of a panelist audience meter device.

17. A storage medium as defined in claim 16, wherein the instructions, when executed, further cause the machine to apply collected household tuning minutes data from the second MM device to a model with the coefficients to calculate the probability of ambient tuning.

18. A storage medium as defined in claim 17, wherein the instructions, when executed, further cause the machine to include second AGC values and a second code status within the collected household tuning minute data.

19. A storage medium as defined in claim 15, wherein the instructions, when executed, further cause the machine to identify a code status of at least one of no detected codes, some detected codes or codes detected in all minutes.

20. A storage medium as defined in claim 19, wherein the instructions, when executed, further cause the machine to determine whether detected codes are stacked or unstacked.

21. A storage medium as defined in claim 20, wherein the instructions, when executed, further cause the machine to include a stacked/unstacked status when calculating model coefficients.

* * * * *